US012786884B2

(12) United States Patent
Tang et al.

(10) Patent No.: US 12,786,884 B2
(45) Date of Patent: Nov. 3, 2026

(54) BLUETOOTH CONNECTION METHOD AND DEVICE

(71) Applicant: HONOR DEVICE CO., LTD., Shenzhen (CN)

(72) Inventors: Nengfu Tang, Shenzhen (CN); Weilin Gong, Shenzhen (CN); Li Shen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 396 days.

(21) Appl. No.: 18/269,502

(22) PCT Filed: Dec. 9, 2022

(86) PCT No.: PCT/CN2022/138033
§ 371 (c)(1),
(2) Date: Jun. 23, 2023

(87) PCT Pub. No.: WO2023/160120
PCT Pub. Date: Aug. 31, 2023

(65) Prior Publication Data
US 2024/0187992 A1 Jun. 6, 2024

(30) Foreign Application Priority Data
Feb. 25, 2022 (CN) ......................... 202210179176.2

(51) Int. Cl.
*H04W 52/02* (2009.01)
*H04W 76/14* (2018.01)
*H04W 76/30* (2018.01)

(52) U.S. Cl.
CPC ....... *H04W 52/0261* (2013.01); *H04W 76/14* (2018.02); *H04W 76/30* (2018.02)

(58) Field of Classification Search
None
See application file for complete search history.

(56) References Cited

U.S. PATENT DOCUMENTS 10,083,556 B1 9/2018 Jain et al.
10,149,095 B2 12/2018 Lee et al.
(Continued)

FOREIGN PATENT DOCUMENTS

CN 107749097 A 3/2018
CN 108407569 A 8/2018
(Continued)

*Primary Examiner* — Sudesh M. Patidar
*Assistant Examiner* — Justin Michael Whitaker
(74) *Attorney, Agent, or Firm* — WOMBLE BOND DICKINSON (US) LLP

(57) ABSTRACT

Embodiments of this application relate to the technical field of terminals, and disclosed are a Bluetooth connection method and a device, which can ensure both power saving of an electronic device and normal use of a vehicle key APP, thereby improving user experience. The method includes: A first device obtains first positioning information of the first device when a Bluetooth connection between a first application device and a second device application is broken, and creates a geo-fence based on the first positioning information. The first device obtains second positioning information of the first device. It is determined, based on the second positioning information, that the first device is in the geo-fence, and the first device sets, if the first application is in a deactivated state, a state of the first application from the deactivated state to a running state.

15 Claims, 15 Drawing Sheets

(56) References Cited

U.S. PATENT DOCUMENTS

| | | | | |
|---|---|---|---|---|
| 2011/0256881 | A1* | 10/2011 | Huang | H04W 4/02 455/456.1 |
| 2016/0142872 | A1 | 5/2016 | Nicholson et al. | |
| 2017/0156061 | A1* | 6/2017 | Hamada | H04W 76/14 |
| 2022/0191641 | A1 | 6/2022 | Hou et al. | |
| 2023/0035010 | A1* | 2/2023 | Kalkunte | G01S 13/825 |
| 2023/0041669 | A1 | 2/2023 | Zhang et al. | |

FOREIGN PATENT DOCUMENTS

| | | | |
|---|---|---|---|
| CN | 110366155 | A | 10/2019 |
| CN | 110612554 | A | 12/2019 |
| CN | 113225690 | A | 8/2021 |
| CN | 113498016 | A | 10/2021 |
| CN | 113766478 | A | 12/2021 |
| CN | 114257960 | A | 3/2022 |
| CN | 113615217 | B | 12/2022 |
| EP | 3131317 | A1 | 2/2017 |
| EP | 3920558 | A1 | 12/2021 |
| WO | 2021115459 | A1 | 6/2021 |

* cited by examiner

BLUETOOTH CONNECTION METHOD AND DEVICE

CROSS-REFERECNE TO RELATED APPLICATIONS

This application is a national stage of International Application No. PCT/CN2022/138033, filed on Dec. 9, 2022, which claims priority to Chinese Patent Application No. 202210179176.2, filed on Feb. 25, 2022. The disclosures of both of the aforementioned applications are hereby incorporated by reference in their entireties.

TECHNICAL FIELD

This application relates to the technical field of terminals, and in particular, to a Bluetooth connection method and a device.

BACKGROUND

Currently, unconscious vehicle control may be implemented by using a Bluetooth technology: A specific implementation process is as follows: A vehicle key application (application, APP) is installed on a mobile phone: after the vehicle key APP establishes a connection to in-vehicle Bluetooth on a vehicle, the vehicle key APP may send a control instruction to in-vehicle Bluetooth: and after receiving the control instruction, in-vehicle Bluetooth may control, based on the control instruction, the vehicle to perform related operations.

When the vehicle key APP is disconnected from in-vehicle Bluetooth, the vehicle key APP may frequently initiate scanning and connection behaviors. The scanning and connection behaviors frequently initiated may cause more power consumption of the mobile phone, which shortens a battery life of the mobile phone. To avoid an influence on power consumption of the mobile phone due to a similar behavior, a power consumption control policy is set for the mobile phone. The power consumption control policy includes a power consumption control condition and a control mechanism. When a behavior performed by an application on the mobile phone meets the power consumption control condition, a corresponding control mechanism is performed on the application.

The mobile phone performs a control mechanism on the vehicle key APP, for example, the vehicle key APP is enabled to be in a deactivated state or a cleaned state. Subsequently, if a user needs to control the vehicle by using the vehicle key APP, the user needs to manually open the vehicle key APP again, which cannot implement unconscious vehicle control.

SUMMARY

Embodiments of this application provide a Bluetooth connection method and a device, which can ensure both power saving of an electronic device and normal use of a vehicle key APP, thereby improving user experience.

According to a first aspect, a Bluetooth connection method is provided, the method including: A first device obtains first positioning information of the first device when a Bluetooth connection between the first device and a second device is broken, and creates a geo-fence based on the first positioning information. The first device obtains second positioning information of the first device. It is determined, based on the second positioning information, that the first device is in the geo-fence, and the first device sets, if the first application is in a deactivated state, a state of the first application from the deactivated state to a running state.

Based on such a possible implementation, when the Bluetooth connection between the first device and the second device is broken, positioning information of the first device is obtained, that is, positioning information of a vehicle. Then, a geo-fence is obtained based on the positioning information, and a keep-alive policy for the first application is set with reference to the geo-fence. When the first device is in the geo-fence, the first application is enabled to be necessarily in the running state. In this way, the normal use of the vehicle key APP can be ensured.

In a possible implementation, the Bluetooth connection method further includes: The first device establishes a Bluetooth connection to the second device if the first application is in the running state. The first device deletes the geo-fence before the Bluetooth connection between the first device and the second device is broken again. In this way, the geo-fence is deleted in time when the geo-fence does not have a function, to reduce internal memory occupation of the first device, and improve data processing efficiency of the first device.

In a possible implementation, after the obtaining, by the first device, second positioning information of the first device, the Bluetooth connection method further includes: It is determined, based on the second positioning information, that the first device is outside the geo-fence, and the first device sets the state of the first application to the deactivated state. When the Bluetooth connection between the first device and the second device is broken, the first application may control a Bluetooth module to continuously perform scanning, resulting in high power consumption. By using a deactivating policy for the first application set with reference to the geo-fence, when the first device application is outside the geo-fence, the first application is enabled to be necessarily in the deactivated state or a cleaned state. In this way, the first application cannot control the Bluetooth module to perform scanning, thereby reducing power consumption of the first device.

In a possible implementation, the first positioning information is determined based on any one of information about a cell identifier (CEII-ID), information about a global navigation satellite system (global navigation satellite system. GNSS), or information about a destination of most recent navigation.

Based on such a possible implementation, first positioning information with different precision may be determined based on the information about the cell identifier (CEII-ID), the information about the global navigation satellite system (global navigation satellite system, GNSS), or the information about the destination of most recent navigation.

In a possible implementation, the first device further includes a Bluetooth module, the second device includes a second application, the first device establishes a Bluetooth connection to the second device, and the Bluetooth connection method includes: The first application sends a scanning request to the Bluetooth module, where the scanning request includes attribute information of the first application and attribute information of the second application. The Bluetooth module stores the attribute information of the first application in response to the scanning request, and performs signal scanning. The second application publishes a broadcast message, where the broadcast message is used for representing a connection status of the second application. The Bluetooth module finds through scanning, based on the attribute information of the second application, the broadcast message published by the second application, and sends the broadcast message to the first application. The first application sends a Bluetooth connection request to the Bluetooth module after receiving the broadcast message. The Bluetooth module performs scanning again in response to the Bluetooth connection request, and sends a connection request to the second application after finding the broadcast message through the scanning, to enable a Bluetooth connection to be established between the first device and the second device. A method for establishing a Bluetooth connection between devices is provided.

In a possible implementation, attribute data of the first application includes a service name and a package name of the first application, and the attribute information of the second application includes a MAC address of the second device. When subsequently needed, the first application can be quickly pulled up based on the attribute data of the first application. The broadcast messages found through scanning may be screened out based on the attribute information of the second application, thereby improving a processing rate.

In a possible implementation, the first device includes a terminal, the second device includes any one of a vehicle, a sports bracelet, or a sphygmomanometer, the first application includes any one of a vehicle key application, a sports bracelet application, or a sphygmomanometer application, and the second application includes any one of an in-vehicle Bluetooth module, a sports bracelet Bluetooth module, or a sphygmomanometer Bluetooth module.

The Bluetooth connection method may be further applied to another device that performs interaction based on Bluetooth, for example, the sphygmomanometer, the sports bracelet, and the like. In this way an applicable scope of the Bluetooth connection method may be expanded.

In a possible implementation, the geo-fence includes a first geo-fence and a second geo-fence, the first geo-fence is determined based on information about a CEII-ID, and the second geo-fence is determined based on information about a GNSS. The Bluetooth connection method of determining, based on the second positioning information, that the first device is in the geo-fence, and setting, by the first device if the first application is in a deactivated state, a state of the first application from the deactivated state to a running state includes: Third positioning information of the first device is periodically obtained based on a preset time interval if it is determined, based on the second positioning information, that the first device is in the first geo-fence. The first device sets the state of the first application from the deactivated state to the running state if it is determined, based on the third positioning information, that the first device is in the second geo-fence, and the first application is in the deactivated state.

Based on such a possible implementation, a larger range is determined based on the first geo-fence. The third positioning information of the first device can be periodically obtained within the range. A location of the first device is determined based on the third positioning information. When the first device is in the second geo-fence, a range corresponding to the second geo-fence is smaller, and the first application is enabled to be in the running state in such a smaller range, which can further reduce power consumption of the first device.

In a possible implementation, a GNSS includes a global positioning system GPS, a global navigation satellite system GLONASS, a Beidou navigation satellite system BDS, a quasi-zenith satellite system QZSS, or a satellite-based augmentation system SBAS.

According to a second aspect, an electronic device is provided. The electronic device has a function of implementing the method according to foregoing first aspect. The function may be implemented by hardware, or may be implemented by hardware executing corresponding software. The hardware or software includes one or more modules corresponding to the above function.

According to a third aspect, an electronic device is provided, including: a processor and a memory: The memory is configured to store computer-executable instructions. When the electronic device runs, the processor executes the computer-executable instructions stored in the memory: so that the electronic device performs the Bluetooth connection method according to any implementation of the first aspect.

According to a fourth aspect, a computer-readable storage medium is provided. The computer-readable storage medium stores instructions, the instructions, when run on a computer, causing the computer to perform the method for processing test data according to any implementation of the first aspect.

According to a fifth aspect, an apparatus (for example, a chip system) is provided. The apparatus includes a processor configured to support a first device in implementing a function involved in the first aspect. In a possible design, the apparatus further includes a memory. The memory is configured to store program instructions and data necessary for the first device. The apparatus, when being a chip system, may include a chip, or may include a chip and another discrete device.

For the technical effects of any one of the designs in the second aspect to the fifth aspect, reference may be made to the technical effects of the designs in the first aspect. Details are not described herein again.

DESCRIPTION OF EMBODIMENTS

Figure 1:
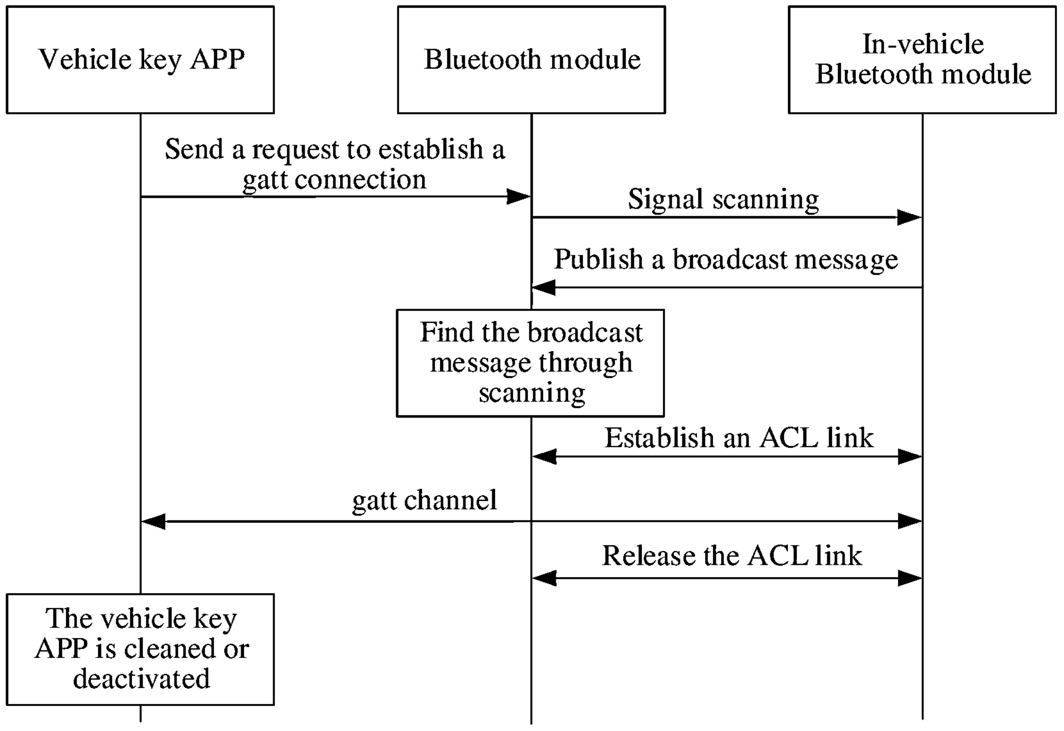
FIG. 1 is a schematic diagram of interaction between modules during Bluetooth connection according to an embodiment of this application.

Technical solutions in embodiments of this application are described below with reference to the accompanying drawings in embodiments of this application. In descriptions of this application, unless otherwise stated, "at least one" means one or more, and "a plurality of" means two or more. In addition, for ease of describing the technical solutions in embodiments of this application clearly, in embodiments of this application, terms such as "first" and "second" are used to distinguish same or similar items with basically same functions and roles. A person skilled in the art may understand that the words "first" and "second" do not limit a number and an execution sequence thereof, and the words "first" and "second" do not necessarily limit difference.

For a clear and concise description of the following embodiments, brief introductions of related concepts or technologies are first provided.

Service name: It is used for representing a function that can be provided by an application.

Package name (Package Name): It is used as a unique identifier of an application. One package name represents one application, and a same package name is not allowed to be used by two applications.

Cell identifier (Cell-ID): It is used for identifying a cell, where different cells correspond to different cell identifiers.

Generic attributes (Generic Attributes, GATT) protocol: It is a protocol for communication between Bluetooth low energy devices.

Asynchronous connection less (Asynchronous Connection less, ACL) link: It is a Bluetooth link and is mainly used for packet data transfer, that is, directionally sending a data packet.

Universally unique identifier (Universally Unique Identifier, UUID): It is used for identifying an attribute type, and is considered as a unique identifier on all dimensions of space and time.

Media Access Control address (Media Access Control Address, MAC address): It is also referred to as a LAN address (LAN Address), an Ethernet address (Ethernet Address), or a physical address (Physical Address), and is an address used for determining a location of a network device.

With the development of Internet of Vehicles technologies and Bluetooth technologies, a mobile phone is about to be a main carrier of a vehicle key. A vehicle key APP with a vehicle key function is installed on the mobile phone, and Bluetooth devices are mounted on a periphery of a vehicle body, so that the vehicle key APP on the mobile phone can establish a connection to the vehicle. After the connection is established, the vehicle may still be unconsciously controlled through the vehicle key APP in an underground garage or a place in which a mobile signal connection is bad. Unconscious vehicle control may be implemented in a plurality of manners. In this application, by using an example in which unconscious vehicle control is performed through Bluetooth, the control process is as follows: The vehicle key APP on the mobile phone is in a running state, when a user approaches the vehicle with the mobile phone carried, the vehicle key APP may establish a Bluetooth connection to the vehicle through Bluetooth of the mobile phone. In this way: data exchange may be performed between the vehicle key APP and the vehicle through an established communication channel. In some solutions, the vehicle may further detect a current user's location, for example, detect that the user is located at a door on the right rear of the vehicle, and then the vehicle informs the vehicle key APP of the current user's location through the communication channel, so that the vehicle key APP may control, based on the user's location, the vehicle to perform related actions, for example, control the vehicle to open the door on the right rear, thereby unconsciously performing an operation on the vehicle.

Specifically: as shown in FIG. 1, when the vehicle key APP on the mobile phone is in a running state, the vehicle key APP may send, to a Bluetooth module of the mobile phone, a request to establish a gatt connection. After the Bluetooth module receives the request to establish a gatt connection, the Bluetooth module performs signal scanning.

When the user approaches the vehicle with the mobile phone carried, a broadcast message published by an in-vehicle Bluetooth module on the vehicle may be found by the Bluetooth module through scanning, and an ACL link is established between the Bluetooth module and the in-vehicle Bluetooth module. After the connection between the Bluetooth module and the in-vehicle Bluetooth module is established, a gatt channel is formed between the vehicle key APP and the in-vehicle Bluetooth module. The vehicle key APP may send a control instruction to in-vehicle Bluetooth through the gatt channel, to implement unconscious vehicle control. If the user is far away from the vehicle with the mobile phone carried, the vehicle key APP may be disconnected from the in-vehicle Bluetooth module due to a limited effective distance for Bluetooth connection. In this case, the ACL link established between the Bluetooth module and the in-vehicle Bluetooth module is released.

When the vehicle key APP is disconnected from the in-vehicle Bluetooth module, the vehicle key APP may frequently initiate scanning and connection behaviors. The scanning and connection behaviors frequently initiated may cause more power consumption of the mobile phone. A power consumption control policy is set for the mobile phone to reduce power consumption caused by a similar behavior. By using the power consumption control policy: the vehicle key APP may be enabled to be in a deactivated state or a cleaned state.

The vehicle key APP cannot connect to the vehicle after the vehicle key APP is in the deactivated state or the cleaned state. Therefore, when the user approaches the vehicle again, the vehicle cannot be automatically identified, and unconscious vehicle control cannot be implemented.

Based on this, embodiments of this application provide a Bluetooth connection method and a device. The method includes: Current positioning information of the mobile phone and a first correspondence are obtained when it is detected that the Bluetooth connection between the vehicle key APP and the vehicle is broken. A geo-fence is created based on the positioning information, and whether the positioning information of the mobile phone changes is detected. When the positioning information changes, the changed positioning information is compared with the geo-fence. If the changed positioning information is consistent with the geo-fence, the vehicle key APP is found based on a package name of the vehicle key APP whose Bluetooth connection is broken in the first correspondence, and the vehicle key APP is enabled to be in a running state. In this way, the vehicle key APP can be normally used, and unconscious vehicle control is implemented, thereby improving user experience.

Figure 2:
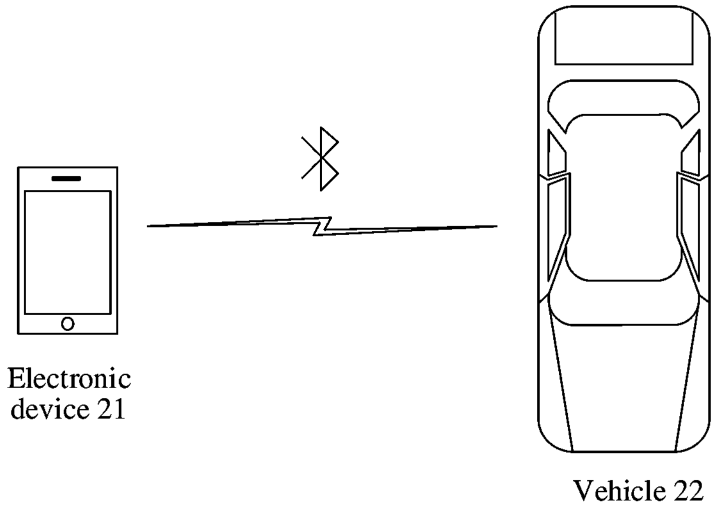
FIG. 2 is a schematic diagram of an architecture of a connection system according to an embodiment of this application.

FIG. 2 is a schematic diagram of an architecture of a connection system according to an embodiment of this application. The system may include an electronic device 21 and a vehicle 22. The electronic device 21 may communicate with the vehicle 22 through Bluetooth.

A vehicle key APP, a map APP, and the like are installed on the electronic device 21. In addition, the electronic device 21 supports a Bluetooth function. The vehicle 22 also supports an in-vehicle Bluetooth function.

For example, the electronic device 21 may be a mobile phone, a tablet computer, a netbook, a cellular phone, a personal digital assistant (personal digital assistant. PDA), or an augmented reality (augmented reality. AR)/virtual reality (virtual reality. VR) device. A specific form of the electronic device is not particularly limited in embodiments of this application.

Figure 3:
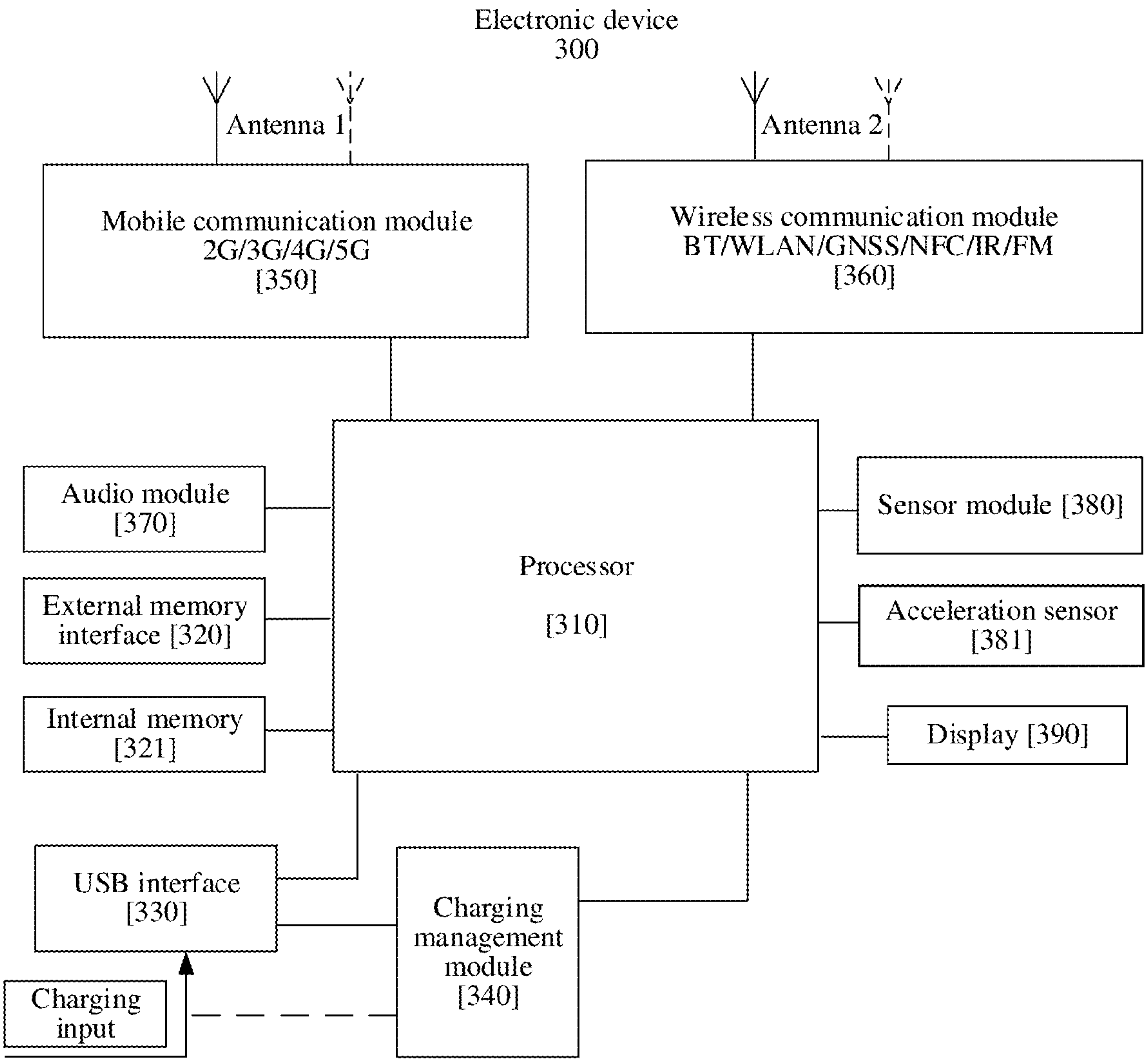
FIG. 3 is a schematic diagram of a hardware structure of an electronic device according to an embodiment of this application.

A structure of the electronic device provided in embodiments of this application is described in the following embodiments of this application by using an example in which an electronic device shown in FIG. 3 is an electronic device 300. As shown in FIG. 3, the electronic device 300 may include a processor 310, an external memory interface 320, an internal memory 321, a universal serial bus (universal serial bus. USB) interface 330, a charging management module 340, an antenna 1, an antenna 2, a mobile communication module 350, a wireless communication module 360, an audio module 370, a sensor module 380, a display 390, and the like.

The sensor module 380 may include sensors such as an acceleration sensor 381, a pressure sensor, a gyroscope sensor, a barometric pressure sensor, a magnetic sensor, a distance sensor, an optical proximity sensor, a fingerprint sensor, a temperature sensor, a touch sensor, an ambient light sensor, and a bone conduction sensor. The acceleration sensor may be configured to measure a speed of the electronic device.

It may be understood that the schematic structure in this embodiment constitutes no specific limitation on the electronic device 300. In some other embodiments, the electronic device 300 may include more or fewer components than those shown in the figure, or some components may be combined, or some components may be split, or components are arranged in different manners. The components in the portrait may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be separate devices, or may be integrated into one or more processors.

The controller may be a nerve center and a command center of the electronic device 300. The controller may generate an operation control signal according to instruction operation code and a time-sequence signal, and control obtaining and executing of instructions.

A memory may be further configured in the processor 310, to store an instruction and data. In some embodiments, the memory in the processor 310 is a cache. The memory may store an instruction or data that is just used or circularly used by the processor 310. If the processor 310 needs to use the instruction or the data again, the processor may directly invoke the instruction or the data from the memory, to avoid repeated access and reduce a waiting time of the processor 310, thereby improving system efficiency.

In some embodiments, the processor 310) may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that a schematic interface connection relationship between the modules in this embodiment is merely an example for description, and constitutes no limitation on the structure of the electronic device 300. In some other embodiments, the electronic device 300 may alternatively use an interface connection manner different from that in the foregoing embodiment, or use a combination of a plurality of interface connection manners.

The charging management module 340 is configured to receive charging input from a charger.

A wireless communication function of the electronic device 300 may be implemented by using the antenna 1, the antenna 2, the mobile communication module 350, the wireless communication module 360, and the like.

The antenna 1 and the antenna 2 are configured to transmit and receive electromagnetic wave signals. Each antenna of the electronic device 300 may be configured to cover one or more communication frequency bands. Different antennas may be multiplexed to improve antenna utilization. For example, the antenna 1 may be multiplexed into a diversity antenna of a wireless local area network.

The mobile communication module 350) may provide a solution to wireless communication such as 2G/3G/4G/5G applied to the electronic device 300. The mobile communication module 350) may include at least one filter, a switch, a power amplifier, and a low noise amplifier (low noise amplifier, LNA).

The wireless communication module 360 may provide a solution to wireless communication applied to the electronic device 300, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 360 may be one or more devices integrating at least one communication processing module.

The electronic device 300 implements a display function by using the GPU, the display 390, the application processor, and the like. The GPU is a microprocessor for image processing, and is connected to the display 390 and the application processor. The GPU is configured to perform mathematical and geometric calculation, and is configured to perform graphics rendering. The processor 310 may include one or more GPUs, and execute program instructions to generate or change display information.

The display 390 is configured to display an image, a video, and the like. The display 390 includes a display panel.

The external memory interface 320 may be configured to connect to an external storage card, for example, a micro SD card, to expand a storage capability of the electronic device 300. The external storage card communicates with the processor 310 by using the external memory interface 320, to implement a data storage function. For example, a file such as a music or a video is stored in the external storage card.

The internal memory 321 may be configured to store computer executable program code, where the executable program code includes an instruction. The processor 310 runs the instruction stored in the internal memory 321, to perform various function applications and data processing of the electronic device 300. For example, in this embodiment of this application, the processor 310 may execute the instructions stored in the internal memory 321, and the internal memory 321 may include a program storage area and a data storage area.

The electronic device 300 may implement an audio function through the audio module 370. The audio function is, for example, music playback and sound recording.

The audio module 370 is configured to convert digital audio information into analog audio signal output, and is also configured to convert analog audio input into a digital audio signal. The audio module 370 may further be configured to encode and decode audio signals.

A software system of the electronic device may use a layered architecture, an event-driven architecture, a micro-kernel architecture, a micro service architecture, or a cloud architecture. In the embodiments of the present invention, an Android™ system with a layered architecture is used as an example to illustrate a software structure of the electronic device.

In the layered architecture, software is divided into several layers, and each layer has a clear role and task. Layers communicate with each other through software interfaces. In some embodiments, the Android™ system is divided into four layers that are respectively an application layer, an application framework layer, an Android runtime and system library, and a kernel layer from top to bottom.

The application layer may include a series of application packages.

Figure 4:
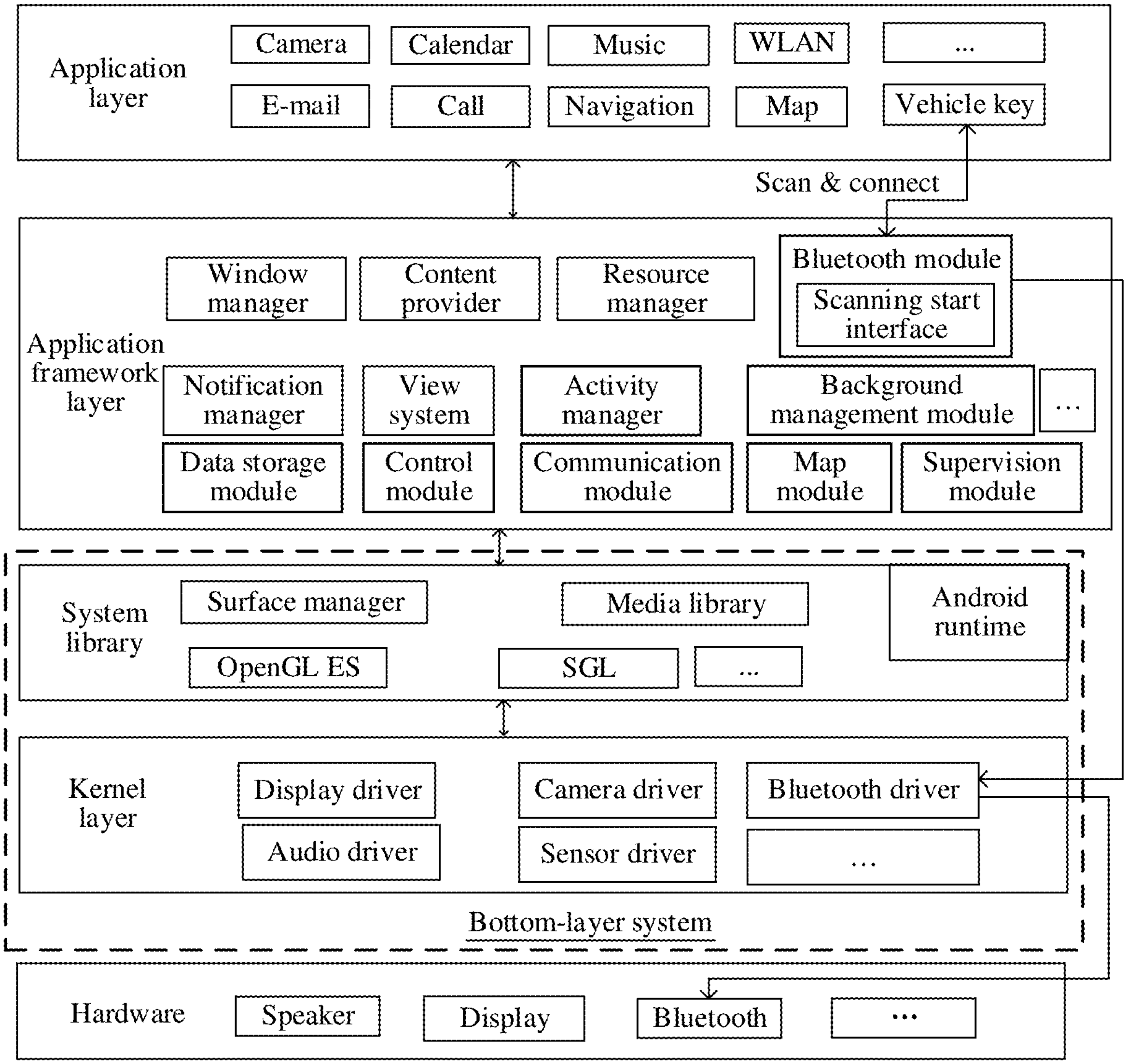
FIG. 4 is a schematic diagram of a software structure of an electronic device according to an embodiment of this application.

As shown in FIG. 4, the application packages may include applications such as E-mail, camera, calendar, phone, music, navigation, WLAN, maps, and vehicle key.

The application framework layer provides an application programming interface (application programming interface, API) and a programming framework for the applications at the application layer. The application framework layer includes some predefined functions. The application framework layer may include an activity manager, a window manager, a content provider, a view system, a resource manager, a notification manager, and the like. This is not limited in this embodiment of this application.

In embodiments of this application, the application framework layer may further include a Bluetooth module, a supervision module, a control module, a background management module, a map module, a data storage module, a communication module, and the like. The Bluetooth module may be configured to establish a Bluetooth connection between a vehicle key APP and an in-vehicle Bluetooth module. The supervision module may be configured to detect an abnormal behavior of an application in a mobile phone system, listen to a connection status between the vehicle key APP and in-vehicle Bluetooth, obtain positioning information of the mobile phone, monitor whether the positioning information changes, and monitor a speed of the mobile phone, and the like. The control module may be configured to pull up an APP (for example, the vehicle key APP) or deactivate the APP. The background management module is configured to determine a running status of the application. The map module may be configured to provide navigation information, query for the navigation information, and process the navigation information for a user. The data storage module may be configured to store attribute information of the vehicle key APP, geo-fence information, and the like. The communication module is configured to enable the vehicle key APP to access data.

The activity manager (Activity Manager) is configured to manage a lifecycle of each application. The application generally runs on an operating system in a form of an activity. Each activity corresponds to an activity record (Activity Record) in the activity manager. The activity record records a status of an activity of the application. The activity manager may use the activity record as an identifier to schedule a process of the activity of the application.

The window manager (Window ManagerService) is configured to manage a graphical user interface (graphical user interface. GUI) resource used on a screen, and may be specifically configured to: obtain a size of the screen, create and delete a window, display and hide a window, set a window; manage a focus, manage an input method and a wallpaper, and the like.

The system library, the kernel layer, and the like under the application framework layer may be collectively referred to as a bottom-layer system. The bottom-layer system includes a bottom-layer display system configured to provide a display service. For example, the bottom-layer system includes a display driver in the kernel layer, a surface manager in the system library, and the like.

The Android runtime (Android Runtime) includes a core library and a virtual machine. The Android runtime is responsible for scheduling and managing the Android system. The core library includes two parts: One part is a performance function that the Java language needs to invoke, and the other part is a core library of Android. The application layer and the application framework layer are run in the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of function modules, for example, a surface manager (surface manager), a media library (media library), OpenGL ES, and SGL.

The surface manager is configured to manage a display subsystem, and provide fusion of 2D and 3D layers of a plurality of applications.

The media library supports play back and recording of a plurality of common audio and video formats, a static image file, and the like. The media library may support a plurality of audio and video encoding formats such as MPEG4, H.264, MP3, AAC, AMR, JPG, and PNG.

The OpenGL ES is configured to implement three-dimensional graphics drawing, image rendering, composition, layer processing, and the like.

The SGL is a drawing engine for 2D drawings.

The kernel layer is a layer between hardware and software. The kernel layer includes at least a display driver, a camera driver, an audio driver, and a sensor driver. The hardware includes at least a speaker, a display, and Bluetooth.

In some embodiments, the user needs to bind a mobile phone to a vehicle before controlling the vehicle by using a vehicle key APP. A binding process may include the following steps:

Step 1: Install a vehicle key APP on a mobile phone system, and register an account on the vehicle key APP. The vehicle key APP may be configured to control operations such as unlocking a vehicle, locking the vehicle, starting the vehicle, opening/closing a trunk, turning on/off an air conditioner, adjusting a temperature of the air conditioner, turning on/off seat heating, flashing lights, whistling, and ventilating.

Step 2: Obtain vehicle information. The vehicle information includes a MAC address, a UUID, an engine number, and the like of the vehicle.

Step 3: Bind the registered account of the vehicle key APP to the vehicle.

Firstly, the vehicle information is entered on the vehicle key APP. To be specific, the registration number is logged in on the vehicle key APP. After the registered account is successfully logged in, the vehicle information is inputted, so that the vehicle information is entered. The vehicle information includes a MAC address, a UUID, an engine number, and the like of the vehicle. Since all the MAC address, the UUID, and the engine number include a long series of numbers, the user is likely to make mistakes when inputting the vehicle information. In view of this, to avoid errors in inputting the vehicle information, an electronic code (such as a two-dimensional code or a barcode) may be generated based on the MAC address, the UUID, and the engine number of the vehicle, and the generated electronic code is displayed (for example, displayed on a central control screen of the vehicle) to the user, so that the vehicle information is automatically entered after the user scans the electronic code.

Then, the user completes real-name authentication. To be specific, the user inputs a name and an identity card number into the vehicle key APP, the mobile phone system performs facial recognition and comparison, and real-name authentication is completed after comparison is successful.

Finally, a security code or biometric recognition is set. The security code may be a password for using the vehicle key APP, and the biometric recognition may be fingerprint recognition or facial recognition. The security code or biometric recognition is set to view vehicle privacy data related to the user, for example, a current location of the vehicle, traveling tracks of a past week, and the like. In this way, it can be considered that the mobile phone is bound to the vehicle.

Figure 5A:
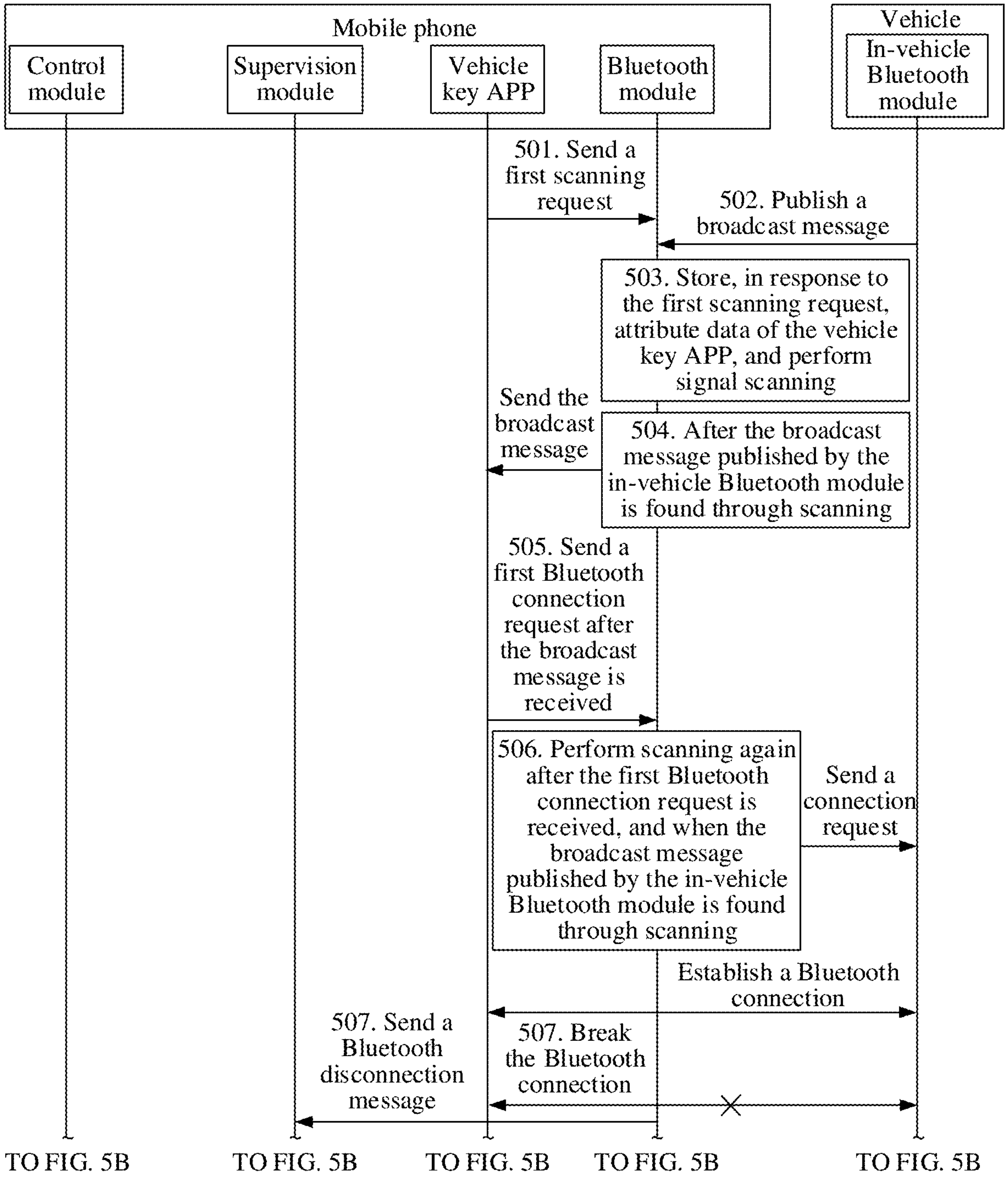
FIG. 5A and FIG. 5B is a schematic flowchart 1 of a Bluetooth connection method according to an embodiment of this application.
Figure 5B:
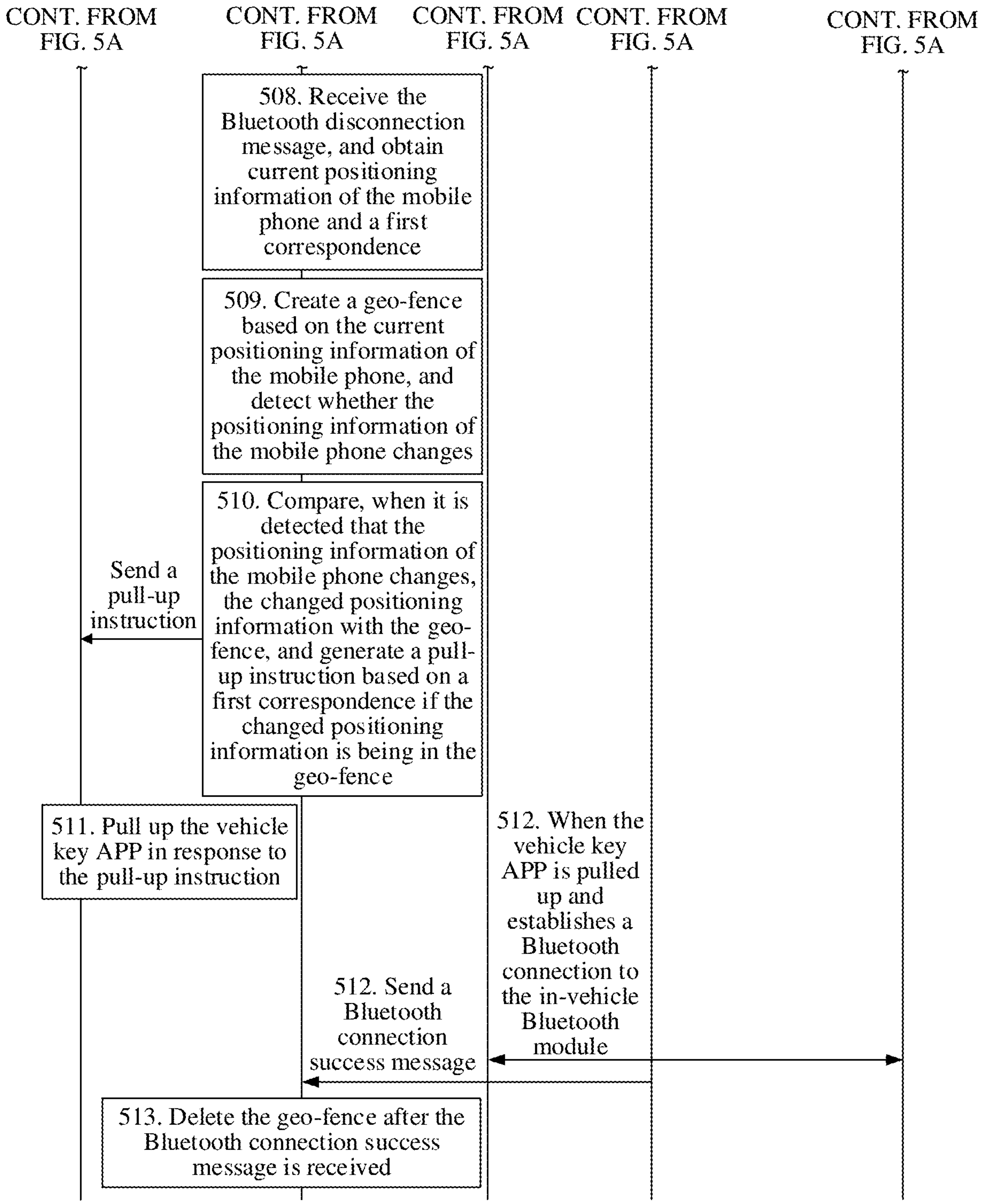

As shown in FIG. 5A and FIG. 5B, an embodiment of this application provides a Bluetooth connection method. Using a connection between a mobile phone and a vehicle as an example, the method includes the following steps:

501. A vehicle key APP on a mobile phone sends a first scanning request to a Bluetooth module.

The first scanning request includes attribute data of the vehicle key APP and attribute information of a vehicle. For example, the attribute data of the vehicle key APP may include a service name and a package name of the vehicle key APP. The attribute information of the vehicle may include a MAC address of the vehicle, a UUID of the vehicle, and the like.

When the vehicle key APP runs, a trigger condition for the vehicle key APP to initiate the first scanning request may include any one of the following: 1. The user turns on Bluetooth of the mobile phone. 2. The vehicle key APP is switched to a running state from a non-running state. 3. A positioning system is started. 4. The mobile phone is restarted. 5. A Bluetooth connection to the vehicle key APP is broken. It may be understood that, the trigger condition is merely exemplary, and a specific implementation of the trigger condition is not limited in embodiments of this application. For example, when the user works in a company, a mobile phone carried by the user may always be kept away from a vehicle. If the vehicle key APP is in a running state, the vehicle key APP may maintain to be in a state in which the Bluetooth connection is broken. In this case, the vehicle key APP sends a scanning request to the Bluetooth module once. After receiving the scanning request, the Bluetooth module periodically performs scanning based on a scanning time interval until the vehicle is found through scanning.

Figure 6:
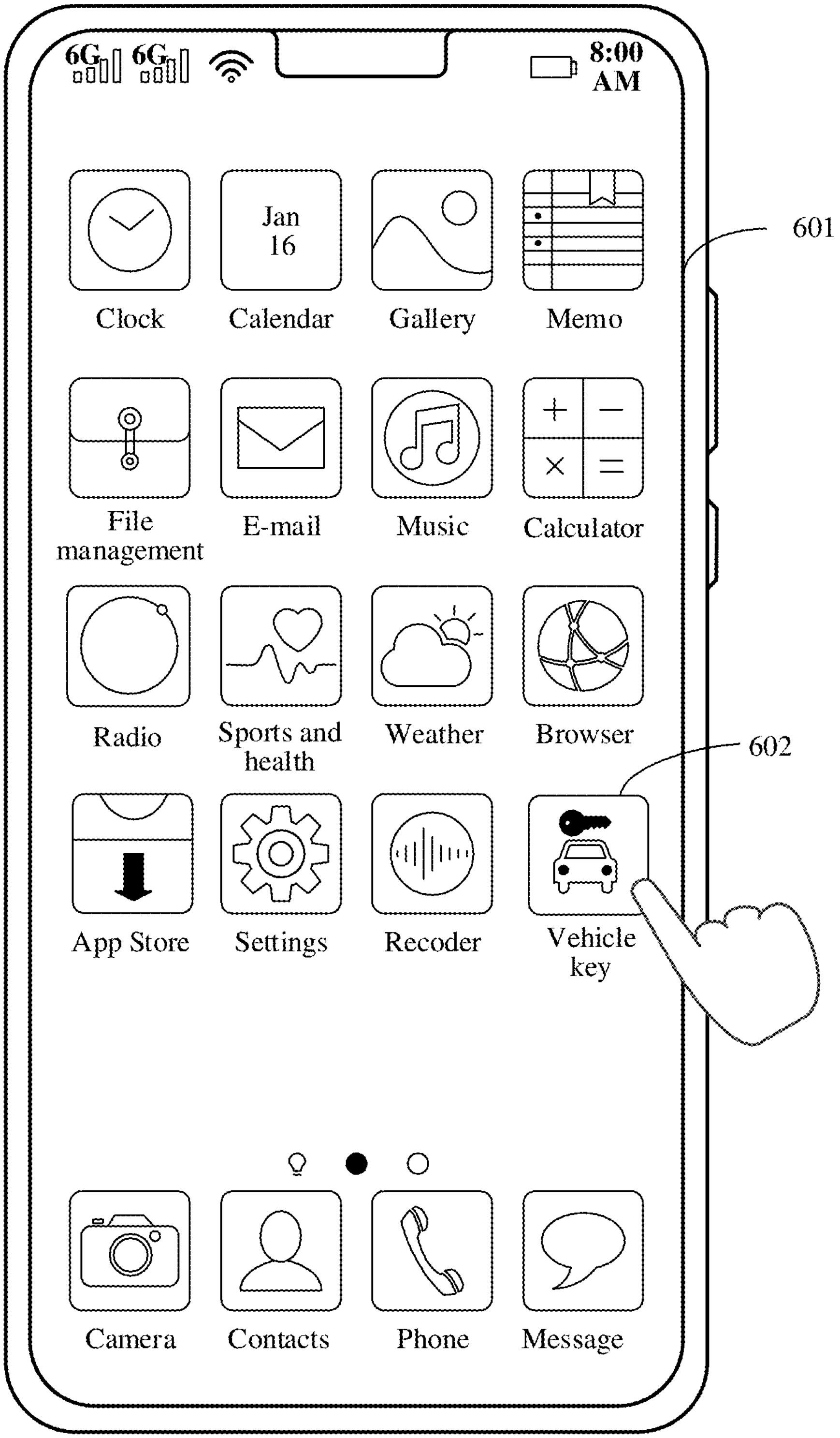
FIG. 6 is a schematic display diagram 1 according to an embodiment of this application.
Figure 7:
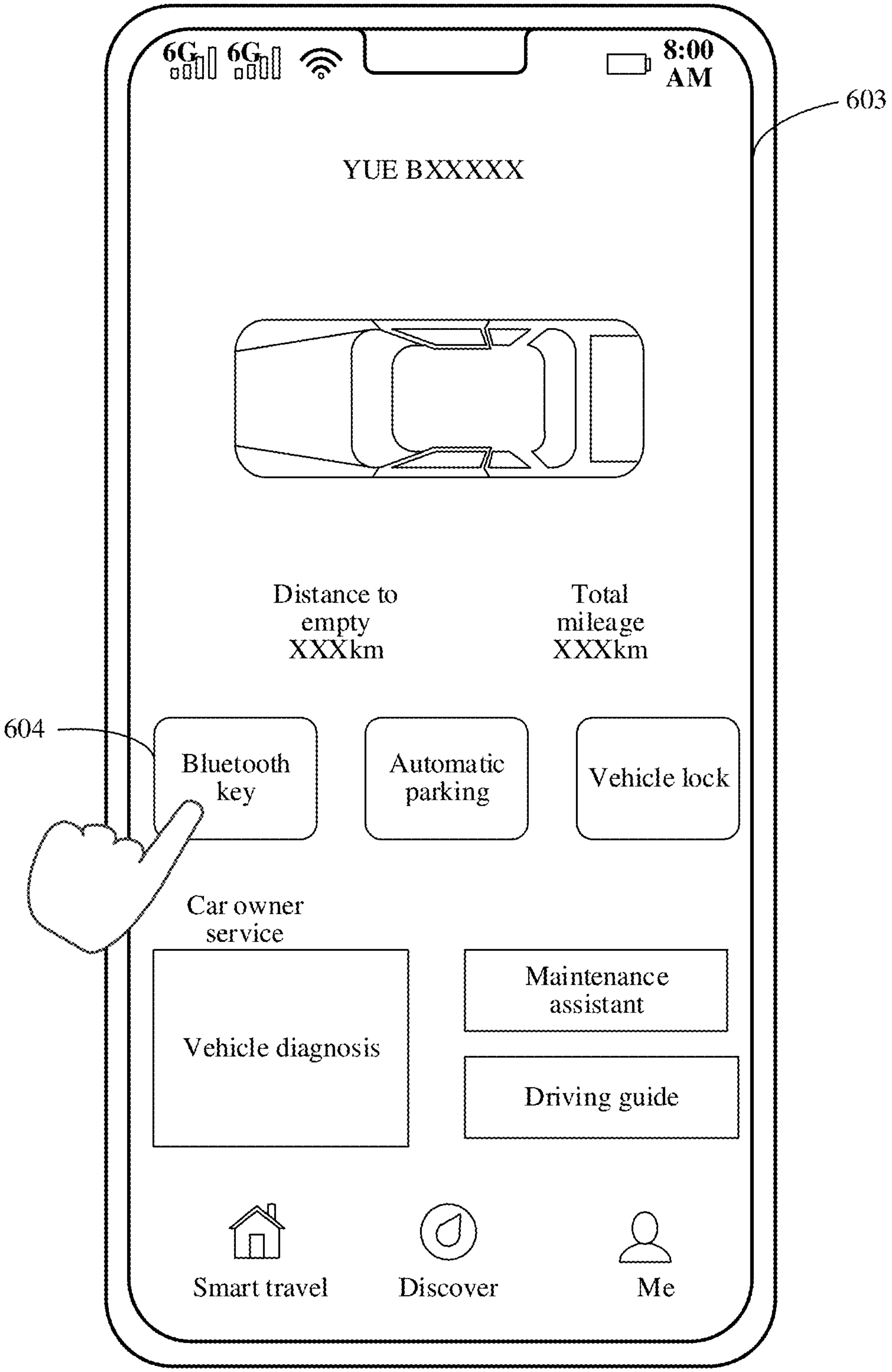
FIG. 7 is a schematic display diagram 2 according to an embodiment of this application.
Figure 8:
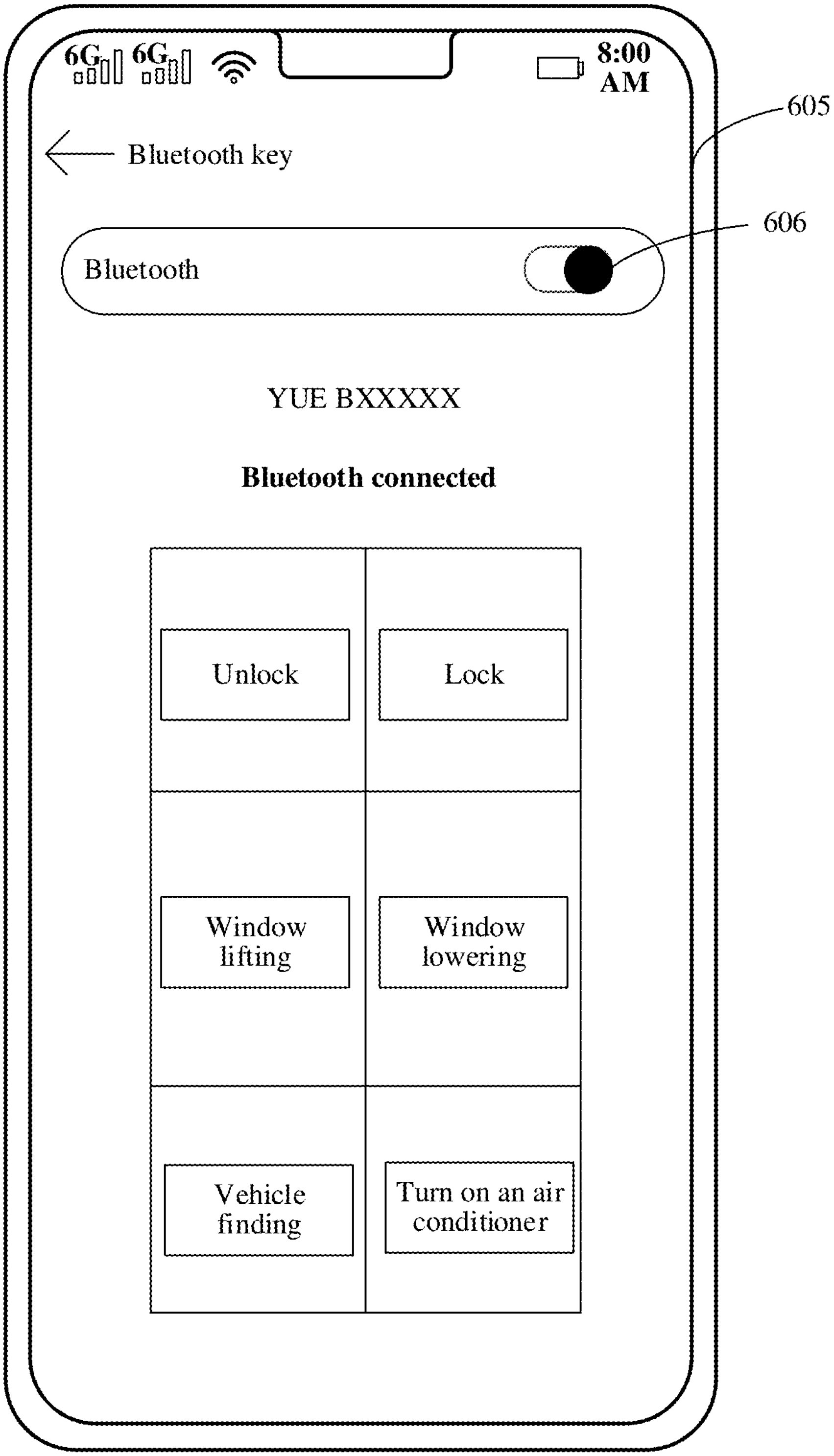
FIG. 8 is a schematic display diagram 3 according to an embodiment of this application.

For example, when the user needs to drive a vehicle for travelling, referring to FIG. 6, the mobile phone may receive a tapping operation performed by the user on an icon 602 of a vehicle key APP on a main interface (that is, a desktop) 601 of the mobile phone. If the vehicle key APP is not in a running state, the mobile phone may open the vehicle key APP in response to the tapping operation. In addition, an interface 603 shown in FIG. 7 is displayed. The interface 603 may include a Bluetooth key function button 604. The mobile phone may display an interface 605 shown in FIG. 8 in response to an operation performed by the user on the Bluetooth key function button 604 on the interface 603. The interface 605 may include a Bluetooth function button 606. The vehicle key APP may establish a Bluetooth connection to the in-vehicle Bluetooth module in response to an operation performed by the user on the Bluetooth function button 606 on the interface 605.

Generally, the vehicle key APP on the mobile phone has been bound to the vehicle before the mobile phone is connected to the vehicle. After binding, the vehicle key APP may record information of the vehicle bound to the vehicle key APP, for example, a MAC address of the vehicle, a UUID of the vehicle, and the like. When the vehicle key APP needs to establish a connection to the vehicle, the vehicle key APP may initiate a first Bluetooth connection request to the Bluetooth module. The first Bluetooth connection request includes the MAC address of the vehicle or the UUID of the vehicle. After the Bluetooth module receives the first Bluetooth connection request, the Bluetooth module may screen out, by using the MAC address of the vehicle or the UUID of the vehicle, broadcast messages found through scanning. The UUID of the vehicle is a 128-bit globally unique identifier, which is usually represented by a 32-byte string.

502. The in-vehicle Bluetooth module publishes a broadcast message.

The broadcast message is used for representing a connection status of the vehicle.

In some embodiments, if the vehicle is not connected to a Bluetooth device, the in-vehicle Bluetooth module may periodically publish a broadcast message. For example, a publish period may be 2s or 6s. In other words, the in-vehicle Bluetooth module may publish a broadcast message once every 2s or every 6s. The broadcast message (ADV_IND) is mainly used for describing a connection status of a current message sending end (the in-vehicle Bluetooth module). The broadcast message may further include an address, broadcast data, transmission power, and the like of the message sending end (the in-vehicle Bluetooth module).

The connection status may include a connectable state, a pairable state, and a non-connectable state.

503. The Bluetooth module stores, in response to the first scanning request, the attribute data of the vehicle key APP, and performs signal scanning.

For example, the attribute data of the vehicle key APP may be stored in the data storage module. The data storage module may be a database of the mobile phone, or may be a configuration file. After the Bluetooth module receives the first scanning request, the Bluetooth module may store the service name and the package name of the vehicle key APP in the first scanning request. Subsequently: when the vehicle key APP needs to be pulled up, the supervision module of the mobile phone may search the data storage module based on the package name for a corresponding service name, and further pull up the vehicle key APP.

In addition, referring to FIG. 4, the application system framework layer includes a Bluetooth module. The Bluetooth module may include a scanning start interface. When the vehicle key APP initiates the first scanning request to the Bluetooth module, the scanning start interface of the Bluetooth module invokes a Bluetooth driver in response to the first scanning request, and the Bluetooth driver drives Bluetooth to periodically perform signal scanning.

504. The Bluetooth module sends the broadcast message to the vehicle key APP after finding, through scanning, the broadcast message published by the in-vehicle Bluetooth module.

The Bluetooth module screens out, based on the attribute information of the vehicle in the first scanning request, for example, the MAC address of the vehicle or the UUID of the vehicle, broadcast messages found through scanning. After the broadcast message published by the in-vehicle Bluetooth module is found through scanning, the Bluetooth module may send the broadcast message obtained through screening to the vehicle key APP.

Specifically, when a radio frequency receiving window of the mobile phone successfully matches a radio frequency sending window of a broadcast, and a broadcast radio frequency channel and a mobile phone scanning radio frequency channel are the same. Bluetooth may find a plurality of broadcast messages through scanning. After the plurality of broadcast messages are found through scanning. Bluetooth may screen out, based on the attribute information of the vehicle in the first scanning request, the broadcast messages found through scanning. When a message sending end consistent with the attribute information of the vehicle is screened out, a broadcast message sent by the message sending end is sent to the vehicle key APP.

505. The vehicle key APP sends a first Bluetooth connection request to the Bluetooth module after receiving the broadcast message.

After receiving the broadcast message published by the in-vehicle Bluetooth module, the vehicle key APP may view signal strength of the broadcast message. When the signal strength is greater than a preset threshold, it is considered that a distance between the mobile phone and the vehicle meets a requirement. In this case, the vehicle key APP sends the first Bluetooth connection request to the Bluetooth module.

506. The Bluetooth module performs scanning again after receiving the first Bluetooth connection request, and sends a connection request to the in-vehicle Bluetooth module when the broadcast message published by the in-vehicle Bluetooth module is screened out, so that the in-vehicle Bluetooth module establishes a Bluetooth connection to the vehicle key APP.

With reference to 504 and FIG. 4, after the Bluetooth module receives the first Bluetooth connection request sent by the vehicle key APP, the scanning start interface of the Bluetooth module invokes a Bluetooth driver in response to the first Bluetooth connection request, and the Bluetooth driver drives Bluetooth to perform scanning. After the broadcast message sent by the in-vehicle Bluetooth module is found through scanning. Bluetooth sends a connection request (CONN_REQ) to the in-vehicle Bluetooth module. CONN_REQ is used for notifying the in-vehicle Bluetooth module that the vehicle key APP may send a first synchronization packet to the in-vehicle Bluetooth module during a transmit window (Transmit Window), and the in-vehicle Bluetooth module needs to open the radio frequency receiving window during the transmit window: When receiving the first synchronization packet, the in-vehicle Bluetooth module sends a reply packet to the vehicle key APP. After the vehicle key APP receives the reply packet, it is considered that the connection is successfully established. In an actual connection process, the vehicle key APP may receive no reply packet. In this case, the vehicle key APP continuously sends the first synchronization packet until timeout. During this period, the connection is considered to be successful as long as the in-vehicle Bluetooth module sends the reply packet once. In fact, once the first synchronization packet is sent, the connection is considered to be successful regardless of whether the reply packet sent by the in-vehicle Bluetooth module is received.

After the connection is established, the vehicle key APP may send a control instruction to the in-vehicle Bluetooth module. After receiving the control instruction, the in-vehicle Bluetooth module sends the control instruction to a controller of the vehicle, and the controller of the vehicle controls the vehicle to perform related operations. For example, the control instruction sent by the vehicle key APP to the in-vehicle Bluetooth module may further be to open a door, close the door, close a trunk, turn on an air conditioner, and the like.

Figure 9:
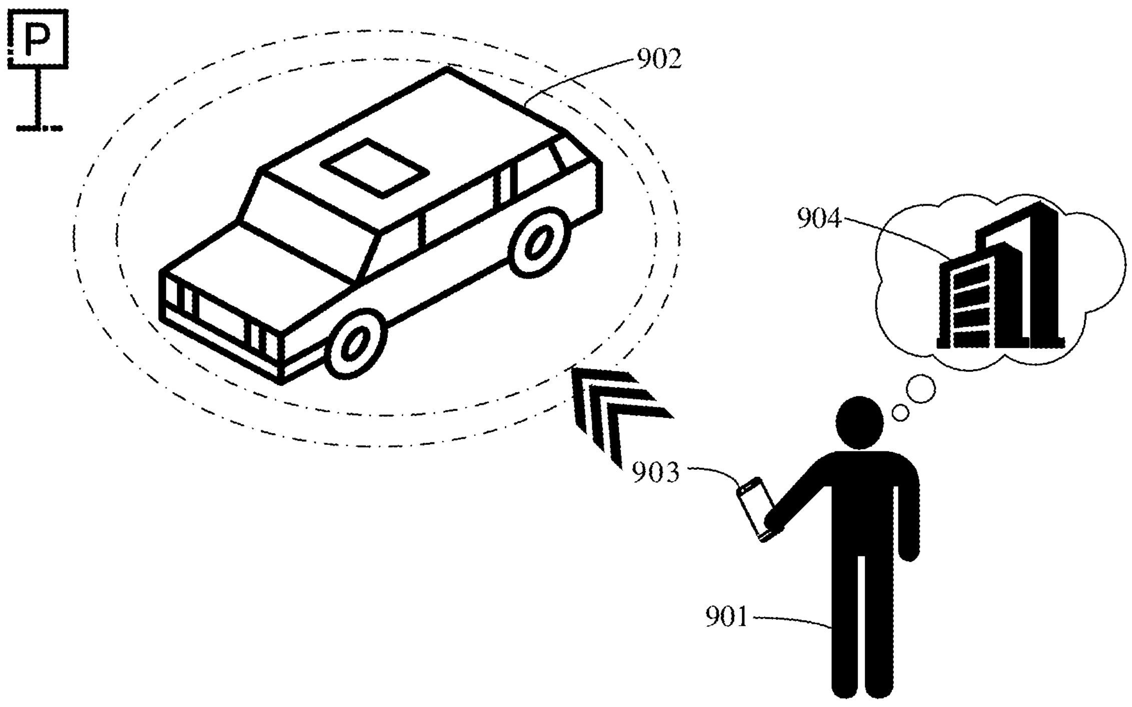
FIG. 9 is a schematic diagram 1 of a Bluetooth connection scenario according to an embodiment of this application.

As shown in FIG. 9, if the vehicle key APP is in a running state, and a Bluetooth connection is not established, the Bluetooth module may perform signal scanning in response to the scanning request of the vehicle key APP. When a user 901 needs to drive a vehicle 902 to a company 904 to work, as the user 901 approaches the vehicle 902, a mobile phone 903 carried by the user 901 can find, through scanning, a broadcast message sent by the vehicle 902. After receiving the broadcast message sent by an in-vehicle Bluetooth module, a Bluetooth module may compare information about a message sending end of the broadcast message with the MAC address of the vehicle or the UUID of the vehicle in the first Bluetooth connection request. When the comparison is consistent, the Bluetooth module sends the broadcast message to the vehicle key APP. After receiving the broadcast message, the vehicle key APP sends the first Bluetooth connection request to the Bluetooth module. After receiving the first Bluetooth connection request, the Bluetooth module performs signal scanning again. After the broadcast message sent by the in-vehicle Bluetooth module is found through scanning, the Bluetooth module sends a connection request to the in-vehicle Bluetooth module. After the in-vehicle Bluetooth module receives the connection request, the vehicle key APP on the mobile phone 903 is enabled to establish a connection to the vehicle 902. Then, the vehicle key APP on the mobile phone 903 may control the vehicle 902 to open a door, and then the user 901 drives the vehicle 902 to the company 904 to work.

507. The Bluetooth module sends a Bluetooth disconnection message to the supervision module when a Bluetooth connection to the vehicle key APP is broken.

Figure 10:
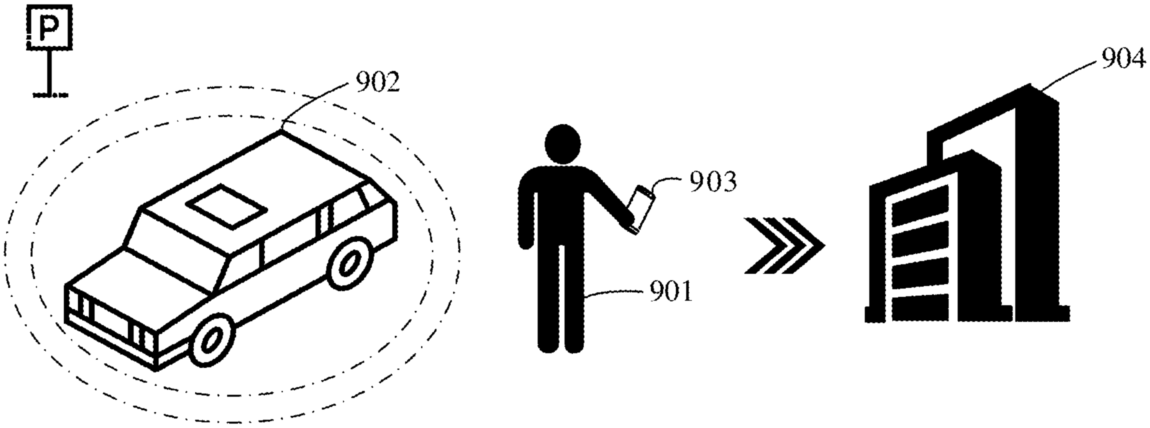
FIG. 10 is a schematic diagram 2 of a Bluetooth connection scenario according to an embodiment of this application.

When the user 901 drives the vehicle 902 with the mobile phone 903 carried, the vehicle key APP maintains a Bluetooth connection to the vehicle. As shown in FIG. 10, after the vehicle 902 arrives near the company 904, the user 901 may take the mobile phone 903 away from the vehicle 902 and walks towards the company 904. When a distance between the mobile phone 903 carried by the user 901 and the vehicle 902 exceeds a working range of Bluetooth, the Bluetooth connection to the vehicle key APP on the mobile phone 903 is passively broken. After detecting that the Bluetooth connection to the vehicle key APP is broken, the Bluetooth module sends a Bluetooth disconnection message to the supervision module. In some embodiments, before the Bluetooth connection to the vehicle key APP is broken, the supervision module may further monitor a speed of the mobile phone. The speed of the mobile phone may be determined by using the acceleration sensor, or may be determined based on a travel distance and a travel time. After the speed of the mobile phone is determined, the acceleration sensor may send the speed of the mobile phone to the supervision module in real time, or send the speed of the mobile phone to the supervision module once at a fixed interval.

When the user drives the vehicle, the speed of the mobile phone carried by the user is consistent with a speed of the vehicle. If the detected speed of the mobile phone is greater than a preset threshold, it is considered that the user and the vehicle are located at a same location (that is, the user is in the vehicle). If the detected speed of the mobile phone is less than the preset threshold, two cases may exist. First case: The vehicle is in a traffic jam mode, and the user and the vehicle are still at a same location. Second case: The vehicle is in a parking mode, and the user and the vehicle are at different locations (that is, the user is not in the vehicle) in this case. Therefore, when the speed of the mobile phone is less than the preset threshold, whether the user and the vehicle are at a same location further needs to be determined. Specifically, whether the user and the vehicle are at a same location may be determined based on a Bluetooth connection status of the vehicle key APP.

If the vehicle key APP is still in a Bluetooth connection state, it is considered that the user and the vehicle are at a same location. If the vehicle key APP is in a Bluetooth disconnection state, it is considered that the user and the vehicle are at different locations. Positioning information of the vehicle needs to be recorded in this case. The positioning information of the vehicle is recorded to determine a geo-fence. Subsequently, when to enable the vehicle key APP to be in a running state (that is, when to pull up the vehicle key APP) is determined based on the geo-fence. In this way, a problem of high power consumption of the mobile phone system caused by the vehicle key APP whose Bluetooth connection is broken is continuously in a running state is avoided. In addition, when the vehicle key APP is in a deactivated state, the vehicle key APP may also be triggered to return to the running state based on the geo-fence and location information of the mobile phone, to improve user experience of using the vehicle key APP to control the vehicle.

508. The supervision module receives the Bluetooth disconnection message, and obtains current positioning information of the mobile phone and a first correspondence.

The first correspondence is a correspondence between positioning information and a package name. The package name is a package name of the vehicle key APP whose Bluetooth connection is broken.

Referring to FIG. 10, when the distance between the mobile phone 903 carried by the user 901 and the vehicle 902 exceeds the working range of Bluetooth, the Bluetooth connection to the vehicle key APP of the mobile phone 903 is broken. In this case, the supervision module receives a Bluetooth disconnection message. The Bluetooth disconnection message received by the supervision module may be sent by the Bluetooth module to the supervision module. Alternatively, a listener is registered in the mobile phone system and is configured to monitor a Bluetooth connection status between the vehicle key APP and the vehicle in real time, and a Bluetooth disconnection message is sent to the supervision module after it is detected that the Bluetooth connection between the vehicle key APP and the vehicle is broken.

When the Bluetooth connection between the vehicle key APP of the mobile phone and the vehicle is broken, it may be considered that the user and the vehicle are still at a same location at a current moment, and positioning information of the mobile phone carried by the user may be recorded to represent positioning information of the vehicle. The supervision module may not only need to obtain current positioning information of the mobile phone, but also needs to obtain a first correspondence. The first correspondence includes a correspondence between positioning information and a package name of the vehicle key APP whose Bluetooth connection is broken. Based on the first correspondence, the vehicle key APP is pulled up when the mobile phone is within a Bluetooth connectable range of the in-vehicle Bluetooth module.

In some embodiments, the supervision module determines the positioning information of the mobile phone through information about a cellular CEII-ID or information about a Wi-Fi CEII-ID obtained by the communication module. Specifically, base station information may be determined based on a cellular CEII-ID or a Wi-Fi CEII-ID, and coverage of a base station is used as the positioning information of the mobile phone. Correspondingly, the first correspondence is a correspondence between the information about the cellular CEII-ID and the package name of the vehicle key APP, or is a correspondence between the information about the Wi-Fi CEII-ID and the package name of the vehicle key APP.

The supervision module may further determine the positioning information of the mobile phone based on global navigation satellite system (global navigation satellite system. GNSS) information obtained by the map module. Specifically, latitude and longitude information may be determined based on the information about the GNSS, and the latitude and longitude information is used as the positioning information of the mobile phone. Correspondingly, the first correspondence is a correspondence between the information about the GNSS and the package name of the vehicle key APP. The information about the GNSS may include global positioning system (global positioning system, GPS) information, global navigation satellite system (global navigation satellite system, GLONASS) information. Beidou navigation satellite system (Beidou navigation satellite system, BDS) information, quasi-zenith satellite system (quasi-zenith satellite system, QZSS) information, satellite based augmentation system (satellite based augmentation systems, SBAS) information, and/or the like.

It is to be noted that, when a Bluetooth connection to the vehicle key APP is broken, if no positioning information can be obtained, a first piece of positioning information that can be obtained through monitoring after the Bluetooth connection is broken may be used as current positioning information of the mobile phone.

509. The supervision module creates a geo-fence based on the current positioning information of the mobile phone, and monitors whether the positioning information of the mobile phone changes.

The supervision module may determine base station information based on the information about the cellular CEII-ID or the information about the Wi-Fi CEII-ID, and coverage of a base station is used as a cell (Cell) geo-fence or a Wi-Fi geo-fence. The supervision module may further determine latitude and longitude information based on the information about the GNSS. A range formed by using the latitude and longitude information as a center coordinate and radiating 200-500 meters outward is used as a GNSS geo-fence.

Positioning precision corresponding to the cell (Cell) geo-fence or the Wi-Fi geo-fence is relatively low and is usually in a range of 1000 m to 2000 m. Positioning precision of information determined based on the information about the GNSS is relatively high. With reference to 808, the supervision module may simultaneously obtain the information about the CEII-ID and the information about the GNSS, and create geo-fences based on the information about the CEII-ID and the information about the GNSS. Specifically, a geo-fence determined based on the information about the CEII-ID is used as a first geo-fence: and a geo-fence determined based on the information about the GNSS is used as a second geo-fence. The second geo-fence may be formed by using a latitude and longitude coordinate corresponding to the information about the GNSS as a center of a circle, and using a connectable range of Bluetooth low energy as a radius. The connectable range of Bluetooth low energy is in a range of 20 m to 30 m. Coverage of the first geo-fence is much greater than coverage of the second geo-fence.

If the positioning information changes, and the changed positioning information is being in the geo-fence, steps 510 and 511 may be performed.

510. Compare, when it is detected that the positioning information of the mobile phone changes, the changed positioning information with the geo-fence, and generate a pull-up instruction based on the first correspondence if the changed positioning information is being in the geo-fence, and send the pull-up instruction to the control module. The pull-up instruction includes a package name of the vehicle key APP.

Specifically, if the changed positioning information is being in the geo-fence, the supervision module determines a package name corresponding to the positioning information based on the first correspondence, and then generates a pull-up instruction based on the package name, to enable the control module to pull up the vehicle key APP.

Figure 11:
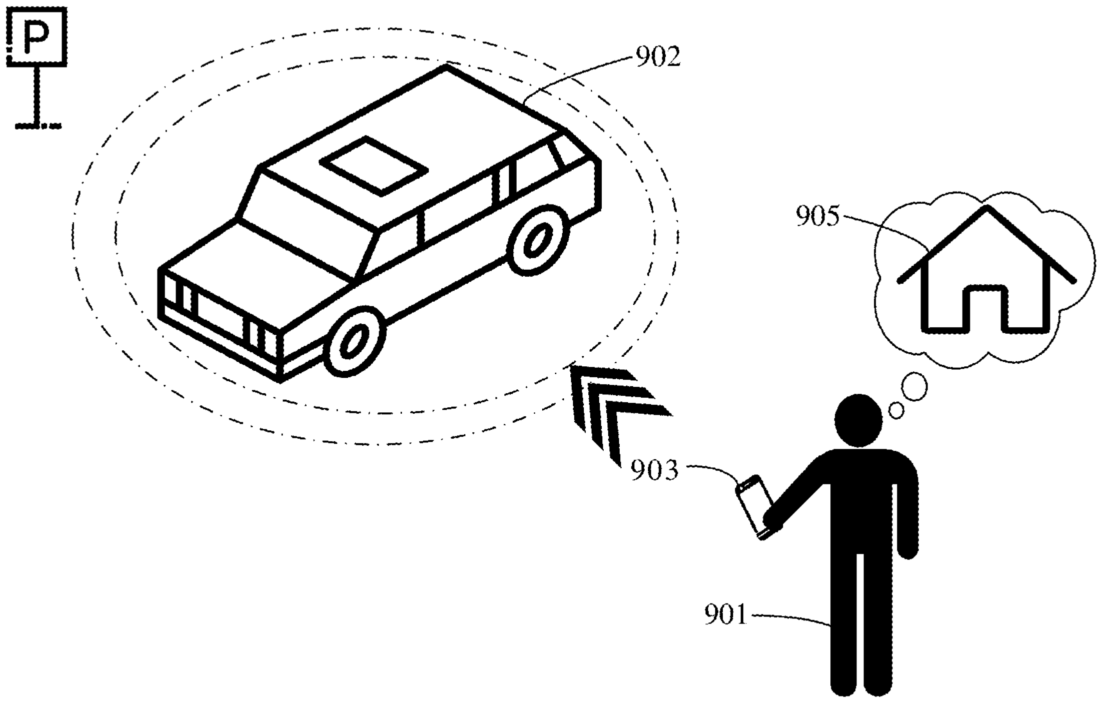
FIG. 11 is a schematic diagram 3 of a Bluetooth connection scenario according to an embodiment of this application.

Referring to FIG. 11, when the user 901 gets off work with the mobile phone 903 carried, it can be detected that the positioning information of the mobile phone 903 has been changing. Each time the positioning information changes, the changed positioning information is compared with the geo-fence. As the user 901 gradually approaches the vehicle 902 in a parking lot, the mobile phone 903 also keeps approaching the geo-fence. If a current geo-fence is the cell (Cell) geo-fence, the Wi-Fi geo-fence, or the GNSS geo-fence, and the mobile phone 903 is in the current geo-fence, a pull-up instruction is generated based on the first correspondence, and the pull-up instruction is sent to the control module.

If the current geo-fence is the first geo-fence, and the mobile phone is in the first geo-fence, the supervision module may periodically obtain the positioning information of the mobile phone 903 through the map module, for example, obtain the information about the GNSS once every 5s. When the obtained mobile phone 903 is in the second geo-fence, the supervision module may generate a pull-up instruction based on the first correspondence, and send the pull-up instruction to the control module.

511. The control module pulls up the vehicle key APP in response to the pull-up instruction.

The control module searches, based on a package name in the pull-up instruction, the data storage module for a service name corresponding to the package name. After the service name is determined, the background management module is searched for whether a vehicle key APP corresponding to the service name exists.

If the vehicle key APP corresponding to the service name exists, whether the vehicle key APP is deactivated. If the vehicle key APP is deactivated, the control module is invoked to activate the vehicle key APP. If the vehicle key APP is not deactivated, it is determined that the vehicle key APP can normally run.

If the vehicle key APP corresponding to the service name does not exist, the control module is invoked to pull up the vehicle key APP.

As shown in FIG. 11, when the user 901 gets off work, the user 901 drives the vehicle 902 back to a dwelling place 905. When the user 901 gradually approaches the vehicle 902, the mobile phone 903 carried by the user 901 may inevitably enter the geo-fence. In this case, the control module may pull up the deactivated vehicle key APP, to enable the vehicle key APP to control the vehicle again.

In some embodiments, when it is detected that the positioning information of the mobile phone changes, the changed positioning information is compared with the geo-fence. If the changed positioning information is not in the geo-fence, a deactivating instruction may be generated based on the first correspondence, and the deactivating instruction is sent to the control module. Then, the control module deactivates the vehicle key APP in response to the deactivating instruction. The deactivating instruction includes a package name of the vehicle key APP. The supervision module determines a package name corresponding to the positioning information based on the first correspondence, and then generates a deactivating instruction based on the package name.

Specifically, the control module searches, based on a package name in the deactivating instruction, the data storage module for a service name corresponding to the package name. After the service name is determined, the background management module is searched for whether a vehicle key APP corresponding to the service name exists. If the vehicle key APP corresponding to the service name exists, whether the vehicle key APP is deactivated. If the vehicle key APP is in a deactivated state, steps end. If the vehicle key APP is not in a deactivated state, the control module is invoked to deactivate the vehicle key APP. If the vehicle key APP corresponding to the service name does not exist, the control module is invoked to enable the vehicle key APP to be in a deactivated state.

For example, referring to FIG. 10, since the user 901 gets off and away from the vehicle 902 for work, after the vehicle key APP is disconnected from the in-vehicle Bluetooth module, it can be detected that the positioning information of the mobile phone 903 carried by the user 901 has been changing. Each time the positioning information changes, the changed positioning information is compared with the geo-fence. Since the user 901 is currently at work, the user 901 may not approach the vehicle 902 during working hours, and the changed positioning information may not be being in the geo-fence. In this case (that is, during the working hours of the user), the vehicle key APP may be deactivated based on the deactivating instruction.

Alternatively, if the changed positioning information is not being in the geo-fence, no processing may be performed, to enable the vehicle key APP to be in a current state.

512. The Bluetooth module sends a Bluetooth connection success message to the supervision module when the vehicle key APP is pulled up and establishes a Bluetooth connection to the in-vehicle Bluetooth module.

513. The supervision module deletes the geo-fence after receiving the Bluetooth connection success message.

The supervision module may delete the geo-fence after receiving the Bluetooth connection success message. Alternatively, a newly created geo-fence may be used to cover an original geo-fence next time the Bluetooth connection is broken. Alternatively, the supervision module may not delete the geo-fence. When the geo-fence is created, a creation time of the geo-fence is simultaneously recorded. When a plurality of geo-fences are stored in the mobile phone, a geo-fence whose creation time is closest to a current moment may be selected.

Figure 12A:
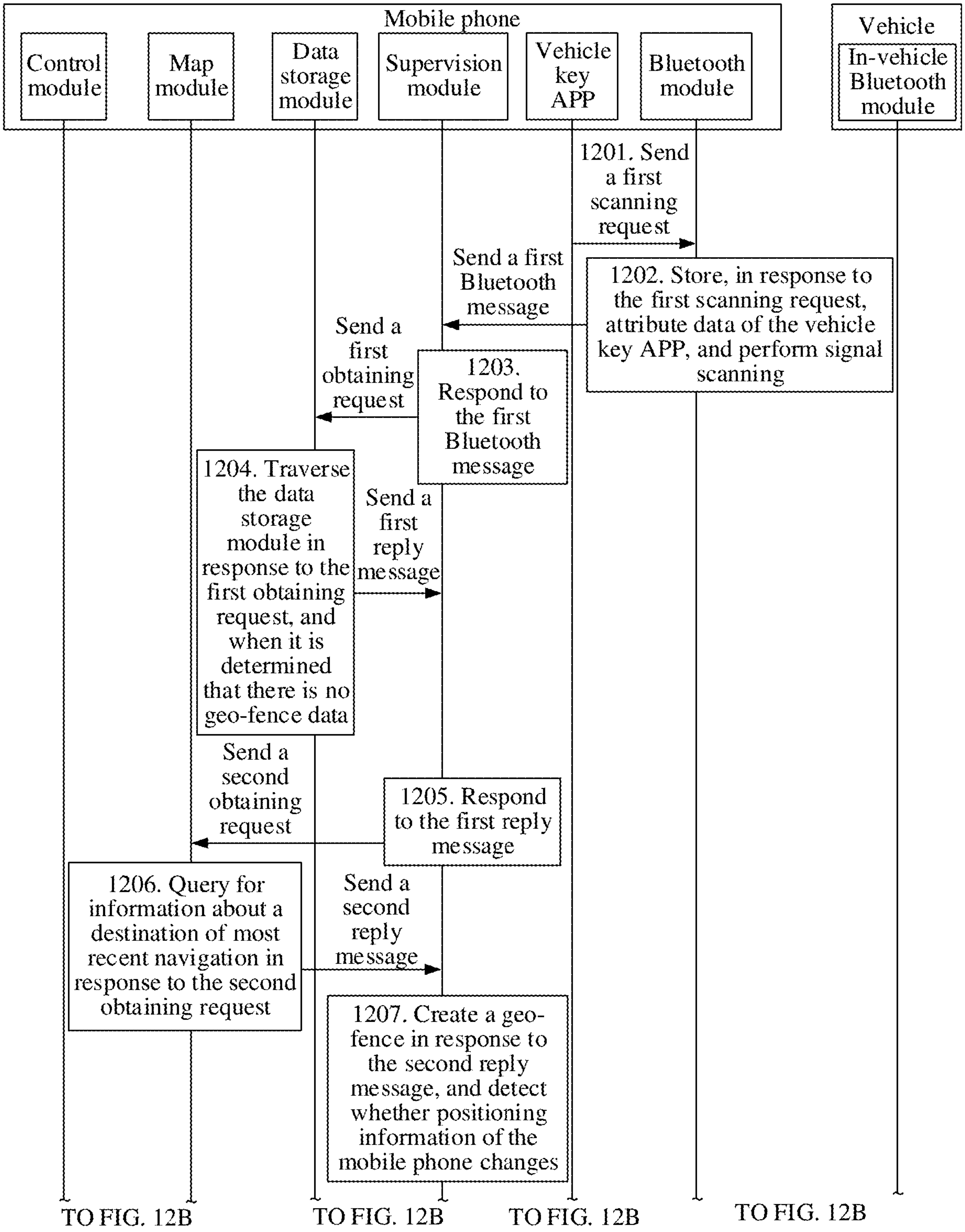
FIG. 12A and FIG. 12B is a schematic flowchart 2 of a Bluetooth connection method according to an embodiment of this application.
Figure 12B:
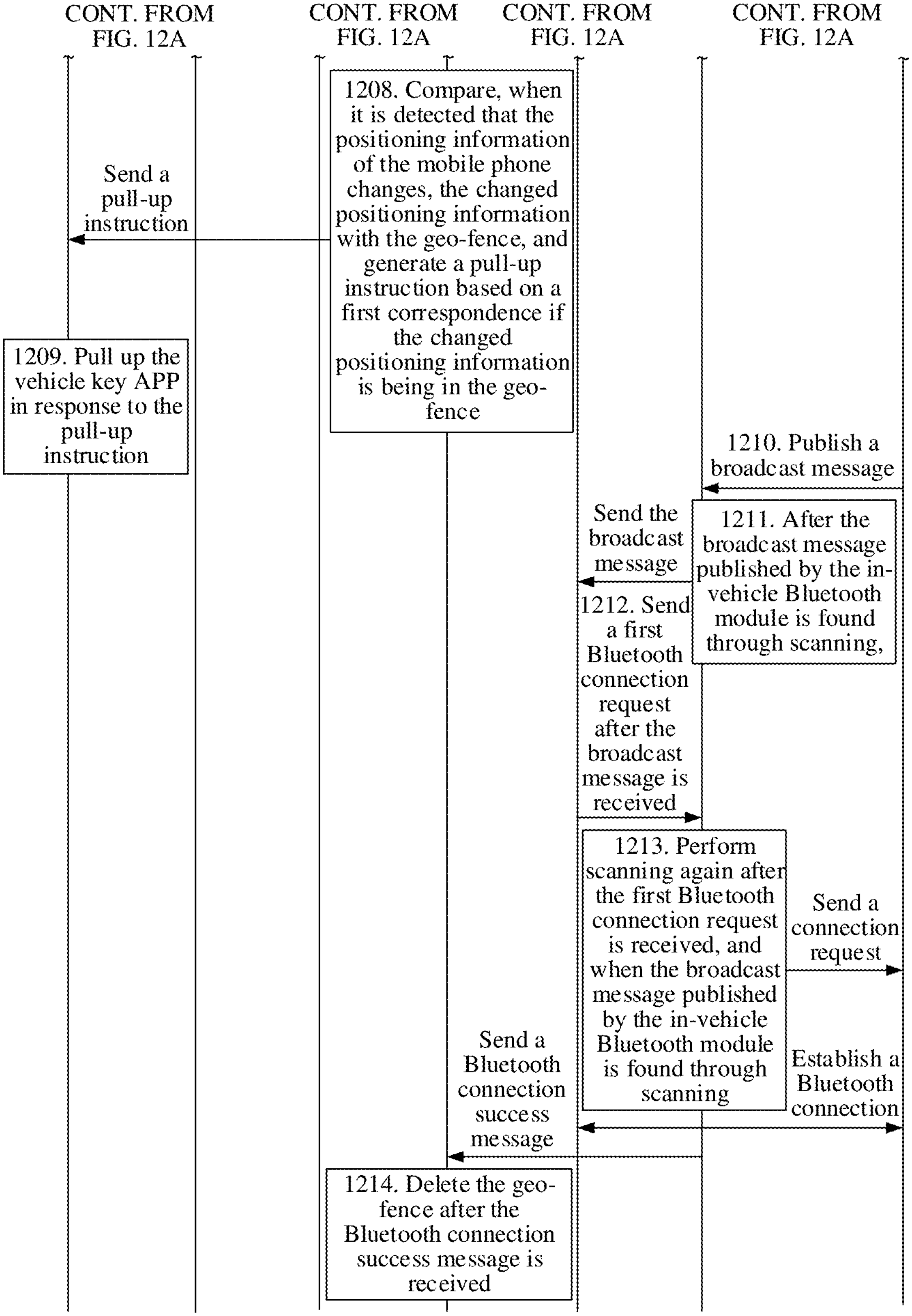

As shown in FIG. 12A and FIG. 12B, an embodiment of this application provides another Bluetooth connection method. The method specifically includes the following steps:

1201. A vehicle key APP on a mobile phone sends a first scanning request to a Bluetooth module.

1202. The Bluetooth module stores, in response to the first scanning request, attribute data of the vehicle key APP, performs signal scanning, and sends a first Bluetooth message to a supervision module.

When the Bluetooth connection method provided in this application is not used for the first time, if the first scanning request is obtained, a data storage module of the mobile phone may be searched for whether geo-fence data is stored.

1203. The supervision module sends a first obtaining request to the data storage module in response to the first Bluetooth message.

The first obtaining request is used for obtaining the geo-fence data.

1204. The data storage module traverses the data storage module in response to the first obtaining request, and sends a first reply message to the supervision module when it is determined that there is no geo-fence data.

The first reply message is used for representing a message of no geo-fence data.

No geo-fence data may be that the supervision module have never created a geo-fence when the vehicle key APP is used for the first time. Alternatively, when the vehicle key APP is not used for the first time, the supervision module loses or deletes the geo-fence created when Bluetooth is broken.

In some embodiments, the data storage module traverses the data storage module in response to the first obtaining request, and sends a second reply message to the supervision module when it is determined that there is geo-fence data. The second reply message includes the geo-fence data.

1205. The supervision module sends a second obtaining request to a map module in response to the first reply message.

The second obtaining request is used for requesting to obtain information about a destination of most recent navigation.

1206. The map module query for the information about the destination of most recent navigation in response to the second obtaining request, and sends second reply message to the supervision module.

The second reply message is used for representing the information about the destination of most recent navigation.

1207. The supervision module creates a geo-fence in response to the second reply message, and detects whether the positioning information of the mobile phone changes.

If the positioning information changes, and the changed positioning information is being in the geo-fence, steps 1208 and 1209 may be performed.

1208. Compare, when it is detected that the positioning information of the mobile phone changes, the changed positioning information with the geo-fence, and generate a pull-up instruction based on the first correspondence if the changed positioning information is being in the geo-fence, and send the pull-up instruction to the control module. The pull-up instruction includes a package name of the vehicle key APP.

1209. The control module pulls up the vehicle key APP in response to the pull-up instruction.

In some embodiments, when it is detected that the positioning information of the mobile phone changes, the changed positioning information is compared with the geo-fence. If the changed positioning information is not in the geo-fence, a deactivating instruction may be generated based on the first correspondence, and the deactivating instruction is sent to the control module. Then, the control module deactivates the vehicle key APP in response to the deactivating instruction. Alternatively, no processing may be performed, to enable the vehicle key APP to be in a current state.

1210. The in-vehicle Bluetooth module publishes a broadcast message.

The broadcast message is used for representing a connection status of the in-vehicle Bluetooth module.

1211. The Bluetooth module sends the broadcast message to the vehicle key APP after finding, through scanning, the broadcast message published by the in-vehicle Bluetooth module.

1212. The vehicle key APP sends a first Bluetooth connection request to the Bluetooth module after receiving the broadcast message.

1213. After receiving the first Bluetooth connection request, the Bluetooth module performs scanning again, and sends a connection request to the in-vehicle Bluetooth module when the broadcast message published by the in-vehicle Bluetooth module is screened out, so that the in-vehicle Bluetooth module establishes a Bluetooth connection to the vehicle key APP, and sends a Bluetooth connection success message to the supervision module.

1214. The supervision module deletes the geo-fence after receiving the Bluetooth connection success message.

Figure 13A:
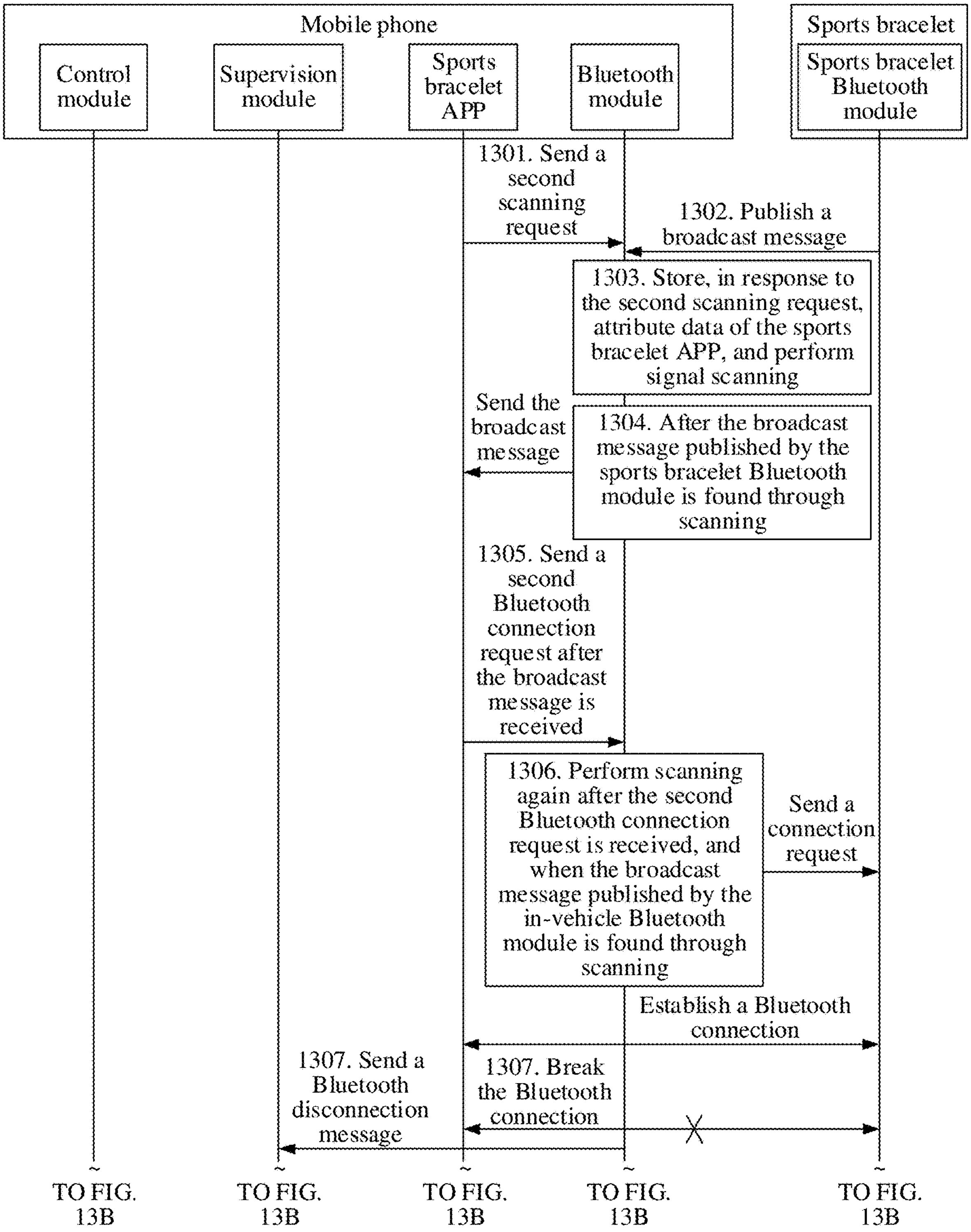
FIG. 13A and FIG. 13B is a schematic flowchart 3 of a Bluetooth connection method according to an embodiment of this application.
Figure 13B:
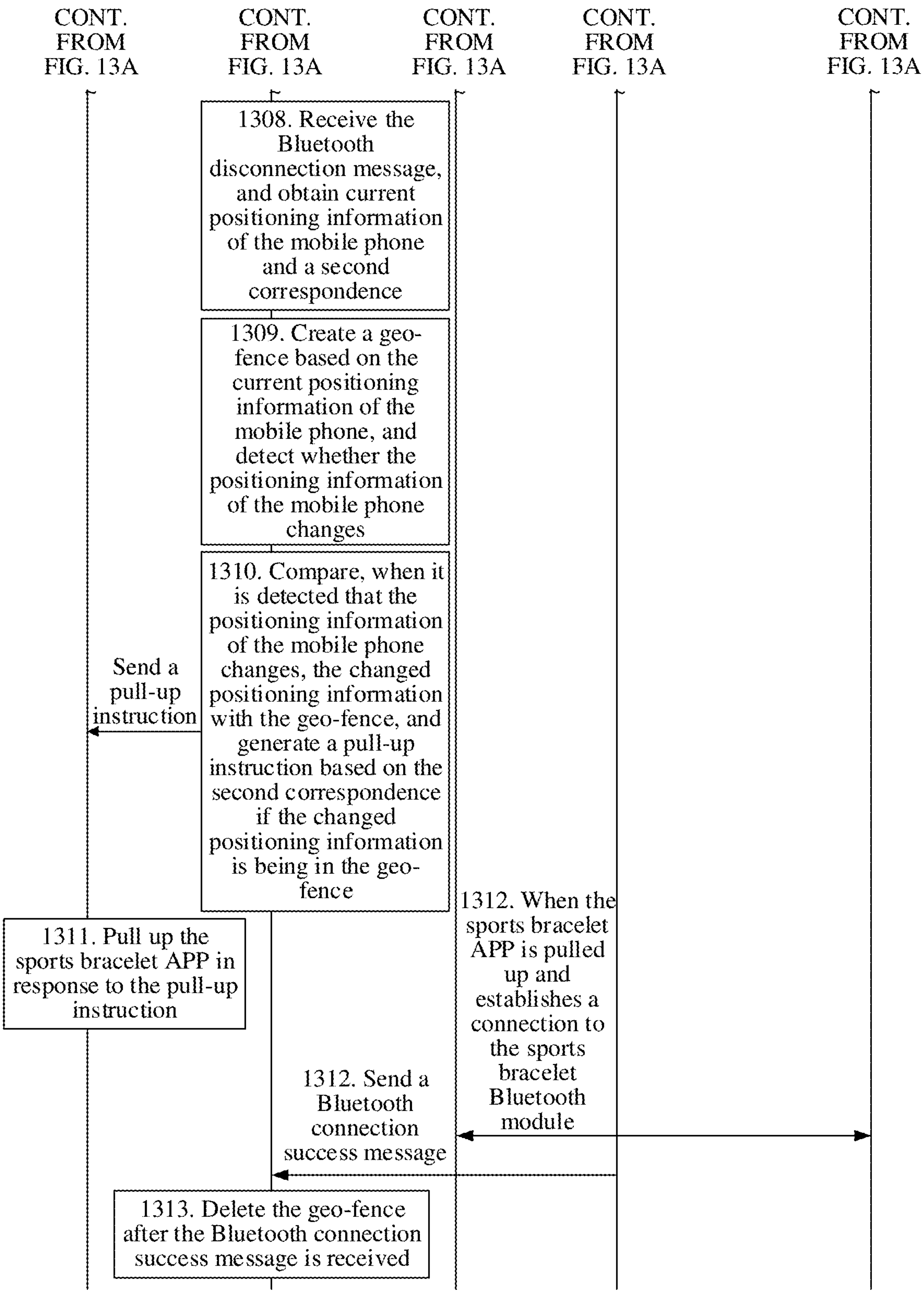

As shown in FIG. 13A and FIG. 13B, an embodiment of this application provides another Bluetooth connection method. The method specifically includes the following steps:

1301. A sports bracelet APP on a mobile phone sends a second scanning request to a Bluetooth module.

The second scanning request includes attribute information of the sports bracelet of the sports bracelet APP and attribute information of a sports bracelet. For example, the attribute data of the sports bracelet APP may include a service name and a package name of the sports bracelet APP. The attribute information of the sports bracelet may include a MAC address and the like of the sports bracelet.

When the sports bracelet APP runs, a trigger condition for the sports bracelet APP to initiate the second scanning request may include any one of the following: 1. The user turns on/off Bluetooth of the mobile phone. 2. The sports bracelet APP is switched to a running state from a non-running state. 3. A positioning system is started. 4. The mobile phone is re-started. 5. A Bluetooth connection to the sports bracelet APP is broken. It may be understood that, the trigger condition is merely exemplary; and a specific implementation of the trigger condition is not limited in embodiments of this application.

For example, when the user works in a company and forgets to wear the sports bracelet, the mobile phone carried by the user is kept away from the sports bracelet. If the sports bracelet APP is in a running state, the sports bracelet APP may maintain to be in a state in which the Bluetooth connection is broken. In this case, the sports bracelet APP sends a scanning request to the Bluetooth module once. After receiving the scanning request, the Bluetooth module periodically performs scanning based on a scanning time interval until the sports bracelet is found through scanning.

For example, when the user wears the sports bracelet, the mobile phone may receive a tapping operation performed on an icon of the sports bracelet APP on a main interface (that is, a desktop) of the mobile phone. If the sports bracelet APP is not in a running state, the mobile phone may start the sports bracelet APP in response to the tapping operation. In addition, a main interface of the sports bracelet APP is entered, and a Bluetooth function interface is entered in response to an operation performed by the user on a Bluetooth function button on the main interface of the sports bracelet APP. Finally, the sports bracelet APP may establish a Bluetooth connection to a sports bracelet Bluetooth module in response to an operation of enabling a Bluetooth function performed by the user on the Bluetooth function interface. Generally, the sports bracelet APP has been bound to the sports bracelet before the mobile phone is connected to the sports bracelet. After binding, the sports bracelet APP may record information of the sports bracelet bound to the sports bracelet APP, for example, a MAC address of the sports bracelet. When the sports bracelet APP needs to establish a connection to the sports bracelet, the sports bracelet APP may initiate a second Bluetooth connection request to the Bluetooth module. The second Bluetooth connection request includes the MAC address of the sports bracelet. After the Bluetooth module receives the second Bluetooth connection request, the Bluetooth module may screen out, by using the MAC address of the sports bracelet, broadcast messages found through scanning.

1302. The sports bracelet Bluetooth module publishes a broadcast message.

The broadcast message is used for representing a connection status of the sports bracelet.

In some embodiments, if the sports bracelet is not connected to a Bluetooth device, the sports bracelet Bluetooth module may periodically publish a broadcast message. For example, the sports bracelet Bluetooth module may publish a broadcast message once every 2s or every 6s. The broadcast message is mainly used for describing a connection status of a message sending end (the sports bracelet Bluetooth module).

1303. The Bluetooth module stores, in response to the second scanning request, the attribute data of the sports bracelet APP, and performs signal scanning.

For example, the attribute data of the sports bracelet APP may be stored in the data storage module. The data storage module may be a database of the mobile phone, or may be a configuration file.

After the Bluetooth module receives the second scanning request, the Bluetooth module may store the service name and the package name of the sports bracelet APP carried in the second scanning request. Subsequently: when the sports bracelet APP needs to be pulled up, the supervision module of the mobile phone may search the data storage module based on the package name for a corresponding service name, and further pull up the sports bracelet APP.

In addition, the application system framework layer includes a Bluetooth module. The Bluetooth module may include a scanning start interface, a scanning stop module, and a connection interface. When the sports bracelet APP initiates a second scanning request to the Bluetooth module, the start scanning interface of the Bluetooth module invokes a Bluetooth driver in response to the second scanning request, and the Bluetooth driver drives Bluetooth to perform signal scanning.

1304. After finding, through scanning, the broadcast message published by the sports bracelet Bluetooth module, the Bluetooth module sends the broadcast message to the sports bracelet APP.

The Bluetooth module screens out, based on the attribute information of the sports bracelet in the second scanning request, for example, the MAC address of the sports bracelet, the broadcast messages found through scanning. After the broadcast message published by the sports bracelet Bluetooth module is found through scanning, the Bluetooth module may send the broadcast message obtained through screening to the sports bracelet APP.

Specifically, when a radio frequency receiving window of the mobile phone successfully matches a radio frequency sending window of a broadcast, and a broadcast radio frequency channel and a mobile phone scanning radio frequency channel are the same. Bluetooth may find a plurality of broadcast messages through scanning. After the plurality of broadcast messages are found through scanning. Bluetooth may screen out, based on the attribute information of the sports bracelet in the second scanning request, the broadcast messages found through scanning. When a message sending end consistent with the attribute information of the sports bracelet is screened out, a broadcast message sent by the message sending end is sent to the sports bracelet APP.

1305. After receiving the broadcast message, the sports bracelet APP sends a second Bluetooth connection request to the Bluetooth module.

After receiving the broadcast message published by the sports bracelet Bluetooth module, the sports bracelet APP may view signal strength of the broadcast message. When the signal strength is greater than a preset threshold, it is considered that a distance between the mobile phone and the sports bracelet meets a requirement. In this case, the sports bracelet APP sends the second Bluetooth connection request to the Bluetooth module.

1306. After receiving the second Bluetooth connection request, the Bluetooth module performs scanning again, and sends a connection request to the sports bracelet Bluetooth module when the broadcast message published by the in-vehicle Bluetooth module is screened out, so that the sports bracelet Bluetooth module establishes a Bluetooth connection to the sports bracelet APP.

With reference to 1304 and FIG. 4, after the Bluetooth module receives the second Bluetooth connection request, the scanning start interface of the Bluetooth module invokes a Bluetooth driver in response to the second Bluetooth connection request, and the Bluetooth driver drives Bluetooth to perform scanning. After the broadcast message sent by the sports bracelet Bluetooth module is found through scanning. Bluetooth sends a connection request (CONN_REQ) to the sports bracelet Bluetooth module. CONN_REQ is used for notifying the sports bracelet Bluetooth module that the sports bracelet APP may send a first synchronization packet to the sports bracelet Bluetooth module during a transmit window (Transmit Window), and the sports bracelet Bluetooth module needs to open the radio frequency receiving window during the transmit window. When receiving the first synchronization packet, the sports bracelet Bluetooth module sends a reply packet to the sports bracelet APP. After the sports bracelet APP receives the reply packet, it is considered that the connection is successfully established.

After the connection is established, the sports bracelet APP may send a control instruction to the sports bracelet Bluetooth module. After receiving the control instruction, the sports bracelet Bluetooth module sends the control instruction to a controller of the sports bracelet, and the controller of the sports bracelet controls the sports bracelet to perform related operations.

1307. The Bluetooth module sends a Bluetooth disconnection message to the supervision module when a Bluetooth connection to the sports bracelet APP is broken.

When the user carries the mobile phone and wears the sports bracelet, the sports bracelet APP maintains the Bluetooth connection to the sports bracelet. When the sports bracelet is taken off by the user, and the distance between the user and the sports bracelet exceeds a working range of Bluetooth, the Bluetooth connection to the sports bracelet APP is broken. After detecting that the Bluetooth connection to the sports bracelet APP is broken, the Bluetooth module sends a Bluetooth disconnection message to the supervision module.

1308. The supervision module obtains current positioning information of the mobile phone and a second correspondence when receiving the Bluetooth disconnection message.

The second correspondence is a correspondence between positioning information and a package name. The package name is a package name of the sports bracelet APP.

When the distance between the user and the sports bracelet exceeds the working range of Bluetooth, the Bluetooth connection to the sports bracelet APP is broken. In this case, the supervision module may obtain positioning information of the mobile phone carried by the user and a second correspondence. The second correspondence includes a correspondence between the positioning information and the package name of the sports bracelet APP whose Bluetooth connection is broken. Based on the second correspondence, the sports bracelet APP may be pulled up when the mobile phone is within a Bluetooth connectable range of the sports bracelet Bluetooth module.

The positioning information of the mobile phone may be determined by the supervision module through information about a cellular CEII-ID or information about a Wi-Fi CEII-ID obtained by the communication module. Specifically, base station information may be determined based on a cellular CEII-ID or a Wi-Fi CEII-ID, and coverage information of a base station is used as the positioning information of the mobile phone. Correspondingly, the second correspondence may be a correspondence between the information about the cellular CEII-ID and the package name of the sports bracelet APP, or may be a correspondence between the information about the Wi-Fi CEII-ID and the package name of the sports bracelet APP.

The positioning information of the mobile phone may further be determined by the supervision module based on global navigation satellite system (global navigation satellite system. GNSS) information obtained by the map module. Specifically, latitude and longitude information may be determined based on the information about the GNSS, and the latitude and longitude information is used as the positioning information of the mobile phone. Correspondingly, the second correspondence may further be a correspondence between the information about the GNSS and the package name of the sports bracelet APP.

1309. The supervision module creates a geo-fence based on the current positioning information of the mobile phone, and monitors whether the positioning information of the mobile phone changes.

The supervision module may determine base station information based on the information about the cellular CEII-ID or the information about the Wi-Fi CEII-ID, and coverage of a base station is used as a cell (Cell) geo-fence or a Wi-Fi geo-fence. The supervision module may further determine latitude and longitude information based on the information about the GNSS. A range formed by using the latitude and longitude information as a center coordinate and radiating 200-500 meters outward is used as a GNSS geo-fence.

Since positioning precision of information determined based on the information about the CEII-ID is relatively low, positioning precision corresponding to the cell (Cell) geo-fence or the Wi-Fi geo-fence is usually in a range of 1000 m to 2000 m. Positioning precision of information determined based on the information about the GNSS is relatively high. With reference to 1308, the supervision module may simultaneously obtain the information about the CEII-ID and the information about the GNSS, and create geo-fences based on the information about the CEII-ID and the information about the GNSS. Specifically, a geo-fence determined based on the information about the CEII-ID is used as a first geo-fence: and a geo-fence determined based on the information about the GNSS is used as a second geo-fence. The second geo-fence may be formed by using a latitude and longitude coordinate corresponding to the information about the GNSS as a center of a circle, and using a connectable range of Bluetooth low energy as a radius. The connectable range of Bluetooth low energy is in a range of 20 m to 30 m. Coverage of the first geo-fence is much greater than coverage of the second geo-fence.

If the positioning information changes, and the changed positioning information is being in the geo-fence, steps 1310 and 1311 may be performed.

1310. Compare, when it is detected that the positioning information of the mobile phone changes, the changed positioning information with the geo-fence, and generate a pull-up instruction based on the second correspondence if the changed positioning information is being in the geo-fence, and send the pull-up instruction to the control module. The pull-up instruction includes a package name of the sports bracelet APP.

When the user carries the mobile phone and gradually approaches the sports bracelet, it can be detected that the positioning information of the mobile phone has been changing. Each time the positioning information changes, the changed positioning information is compared with the geo-fence. If a current geo-fence is the cell (Cell) geo-fence, the Wi-Fi geo-fence, or the GNSS geo-fence, and the mobile phone is in the current geo-fence, a pull-up instruction is generated based on the second correspondence, and the pull-up instruction is sent to the control module.

If the current geo-fence is the first geo-fence, and the mobile phone is in the first geo-fence, the supervision module may periodically obtain the positioning information of the mobile phone through the map module, for example, obtain the information about the GNSS once every 5 s. When the obtained information about the GNSS of the mobile phone is being in the second geo-fence, the supervision module may generate a pull-up instruction based on the second correspondence, and send the pull-up instruction to the control module.

1311. The control module pulls up the sports bracelet APP in response to the pull-up instruction.

When the changed positioning information of the mobile phone may be being in the geo-fence, the control module may pull up the deactivated sports bracelet APP, to enable the sports bracelet APP to control the sports bracelet again.

In some embodiments, when it is detected that the positioning information of the mobile phone changes, the changed positioning information is compared with the geo-fence, and a deactivating instruction may be generated based on the second correspondence if the changed positioning information is not being in the geo-fence, and the deactivating instruction is sent to the control module. Alternatively, no processing may be performed, to enable the sports bracelet APP to be in a current state.

1312. The Bluetooth module sends a Bluetooth connection success message to the supervision module when the sports bracelet APP is pulled up and establishes a Bluetooth connection to the sports bracelet Bluetooth module.

1313. The supervision module deletes the geo-fence after receiving the Bluetooth connection success message.

The supervision module may delete the geo-fence after receiving a first Bluetooth connection success message. Alternatively, a newly created geo-fence may be used to cover an original geo-fence next time the Bluetooth connection is broken. Alternatively, the supervision module may not delete the geo-fence. When the geo-fence is created, a creation time of the geo-fence is simultaneously recorded. When a plurality of geo-fences are stored in the mobile phone, a geo-fence whose creation time is closest to a current moment may be selected. Referring to FIG. 13A and FIG. 13B, it can be learned that, for an APP, for example, a sphygmomanometer, on which data exchange can be performed by using a Bluetooth module, the solutions provided in this application may be adopted to resolve the problem of high power consumption of a mobile phone system.

Some other embodiments of this application provide an electronic device (for example, the electronic device 300 shown in FIG. 3). The electronic device may include a communication module, a memory, and one or more processors. The communication module and the memory are coupled to the processor. The memory is configured to store computer program code, where the computer program code includes computer instructions.

Figure 14:
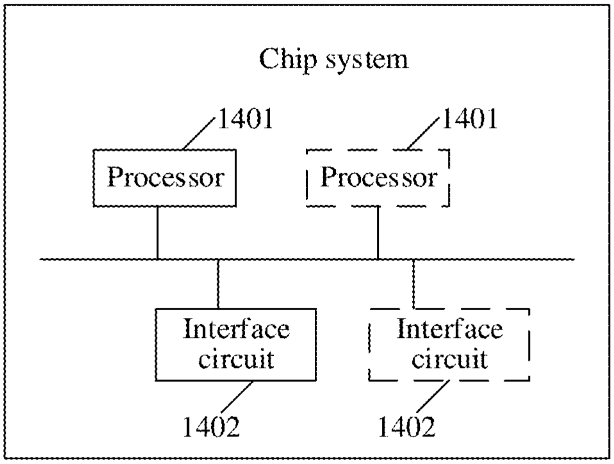
FIG. 14 is a schematic diagram of a structure of a chip system according to an embodiment of this application.

Another embodiment of this application provides a chip system. As shown in FIG. 14, the chip system includes at least one processor 1401 and at least one interface circuit 1402. The processor 1401 and the interface circuit 1402 may be interconnected through a line. For example, the interface circuit 1402 may be configured to receive a signal from another apparatus. In another example, the interface circuit 1402 may be configured to send a signal to another apparatus (for example, the processor 1401).

For example, the interface circuit 1402 may read instructions stored in the memory of the device and send the instructions to the processor 1401. The instructions, when executed by the processor 1401, may cause the electronic device (the electronic device 300 shown in FIG. 3) to perform all of the steps in the foregoing embodiments. Certainly, the chip system may further include other discrete devices. This is not specifically limited in this embodiment of this application.

An embodiment of this application further provides a computer-readable storage medium. The computer-readable storage medium includes computer instructions. The computer instructions, when run on the electronic device (for example, the electronic device 300 shown in FIG. 3), cause the electronic device 300 to perform all of the functions or steps performed by the electronic device (for example, the mobile phone) in the foregoing method embodiments.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an internal structure of an apparatus is divided into different functional modules to complete all or some of the functions described above.

In the several embodiments provided in this application, it should be understood that the disclosed apparatus and method may be implemented in other manners. For example, the described apparatus embodiment is merely exemplary. For example, the module or the unit division is merely a logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic mechanical, or other forms.

The units described as separate parts may or may not be physically separate, and components displayed as units may be one or more physical units, that is, may be located in one position, or may be distributed on different positions. Some or all of the units may be selected according to actual needs to achieve the objectives of the solutions of the embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software function unit and sold or used as an independent product, the integrated unit may be stored in a readable storage medium. Based on such an understanding, the technical solutions in embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (read-only memory. ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A Bluetooth connection method, performed by a first device running a first application, the method comprising:

detecting, by a first device, that a Bluetooth connection between the first device and a second device is broken, based on a Bluetooth disconnection signal from a Bluetooth module of the first device;

responsive to detecting that the Bluetooth connection is broken, obtaining first position information of the first device, and creating a geo-fence based on the first positioning information, wherein the geo-fence comprises a first geo-fence and a second geo-fence that corresponds to a position of the first device at a time when the Bluetooth connection broke, the first geo-fence is determined based on information about a cell identifier (CELL-ID), and the second geo-fence is determined based on information about a global navigation satellite system (GNSS);

obtaining, by the first device, second positioning information of the first device;

determining, based on the second positioning information, that the first device is outside the first geo-fence or the second geo-fence, and setting, by the first device, a state of first application to a deactivated state;

determining, based on the second positioning information, that the first device is in the first geo-fence or the second geo-fence, and setting, by the first device when the first application is in the deactivated state, the state of the first application from the deactivated state to a running state, wherein the determining, based on the second positioning information, that the first device is in the first geo-fence or the second geo-fence, and setting, by the first device when the first application is in a deactivated state, a state of the first application from the deactivated state to a running state comprises: periodically obtaining third positioning information of the first device based on a preset time interval when it is determined, based on the second positioning information, that the first device is in the first geo-fence; and setting, by the first device, the state of the first application from the deactivated state to the running state when it is determined, based on the third positioning information, that the first device is in the second geo-fence, and the first application is in the deactivated state.

2. The method according to claim 1, further comprising:

establishing, by the first device, a Bluetooth connection to the second device when the first application is in the running state; and deleting, by the first device, the first geo-fence and the second geo-fence before the Bluetooth connection between the first device and the second device is broken again.

3. The method according to claim 1, wherein the first positioning information is determined based on any one of the following: information about CELL-ID, information about a GNSS, or information about a destination of a most recent navigation.

4. The method according to claim 2, wherein the second device comprises a second application, and the establishing, by the first device, a Bluetooth connection to the second device comprises:

sending, by the first application, a scanning request to the Bluetooth module, wherein the scanning request comprises attribute information of the first application and attribute information of the second application;

storing, by the Bluetooth module in response to the scanning request, the attribute information of the first application, and performing signal scanning;

publishing, by the second application, a broadcast message, wherein the broadcast message is used for representing a connection status of the second application;

finding, by the Bluetooth module through scanning based on the attribute information of the second application, the broadcast message published by the second application, and sending the broadcast message to the first application;

sending, by the first application, a Bluetooth connection request to the Bluetooth module after receiving the broadcast message; and performing scanning again, by the Bluetooth module in response to the Bluetooth connection request, and sending a connection request to the second application after finding the broadcast message through the scanning, to enable a Bluetooth connection to be established between the first device and the second device.

5. The method according to claim 4, wherein attribute data of the first application comprises a service name and a package name of the first application, and the attribute information of the second application comprises a MAC address of the second device.

6. The method according to claim 4, wherein the first device comprises a terminal, the second device comprises any one of a vehicle, a sports bracelet, or a sphygmomanometer, the first application comprises any one of a vehicle key application, a sports bracelet application, or a sphygmomanometer application, and the second application comprises any one of an in-vehicle Bluetooth module, a sports bracelet Bluetooth module, or a sphygmomanometer Bluetooth module.

7. The method according to claim 3, wherein the GNSS comprises a global positioning system (GPS), a global navigation satellite system (GLONASS), a Beidou navigation satellite system (BDS), a quasi-zenith satellite system (QZSS), or a satellite-based augmentation system (SBAS).

8. A first device, comprising:

a processor and a memory that is configured to store computer instructions, that when executed by the processor of the first device, causes the first device to:

detect that a Bluetooth connection between the first device and a second device is broken, based on a Bluetooth disconnection signal from a Bluetooth module of the first device;

responsive to detecting that the Bluetooth connection is broken, obtain first position information of the first device, and create a geo-fence based on the first positioning information, wherein the geo-fence comprises a first geo-fence and a second geo-fence that corresponds to a position of the first device at a time when the Bluetooth connection broke, the first geo-fence is determined based on information about a cell identifier (CELL-ID), and the second geo-fence is determined based on information about a global navigation satellite system (GNSS);

obtain a second positioning information of the first device;

determine, based on the second positioning information, that the first device is outside the first geo-fence or the second geo-fence, set a state of the first application to a deactivated state; and determine, based on the second positioning information, that the first device is in the first geo-fence or the second geo-fence, and set, when a first application is in deactivated state, the state of the first application from the deactivated state to a running state, wherein to determine, based on the second positioning information, that the first device is in the first geo-fence or the second geo-fence, and set, when the first application is in a deactivated state, a state of the first application from the deactivated state to a running state comprises: periodically obtaining third positioning information of the first device based on a preset time interval when it is determined, based on the second positioning information, that the first device is in the first geo-fence; and set the state of the first application from the deactivated state to the running state when it is determined, based on the third positioning information, that the first device is in the second geo-fence, and the first application is in the deactivated state.

9. The first device according to claim 8, wherein the first device is further to:

establish a Bluetooth connection to the second device when the first application is in the running state; and delete the first geo-fence and the second geo-fence before the Bluetooth connection between the device and the second device is broken again.

10. The first device according to claim 8, wherein after obtaining the second positioning information of the device, the first device is further to:

determine, based on the second positioning information, that the device is outside the first geo-fence and the second geo-fence, and set the state of the first application to the deactivated state.

11. The first device according to claim 9, wherein the second device comprises a second application, and to establish the e-Bluetooth connection with the second device comprises to:

send, by the first application, a scanning request to the Bluetooth module, wherein the scanning request comprises attribute information of the first application and attribute information of the second application;

store, by the Bluetooth module in response to the scanning request, the attribute information of the first application, and performing signal scanning;

publish, by the second application, a broadcast message, wherein the broadcast message is used for representing a connection status of the second application;

find, by the Bluetooth module through scanning based on the attribute information of the second application, the broadcast message published by the second application, and sending the broadcast message to the first application;

send, by the first application, a Bluetooth connection request to the Bluetooth module after receiving the broadcast message; and perform scanning again, by the Bluetooth module in response to the Bluetooth connection request, and sending a connection request to the second application after finding the broadcast message through the scanning, to enable a Bluetooth connection to be established between the device and the second device.

12. The first device according to claim 11, wherein attribute data of the first application comprises a service name and a package name of the first application, and the attribute information of the second application comprises a MAC address of the second device.

13. The first device according to claim 11, further comprising a terminal, wherein the second device comprises any one of a vehicle, a sports bracelet, or a sphygmomanometer, the first application comprises any one of a vehicle key application, a sports bracelet application, or a sphygmomanometer application, and the second application comprises any one of an in-vehicle Bluetooth module, a sports bracelet Bluetooth module, or a sphygmomanometer Bluetooth module.

14. The device according to claim 8, wherein the GNSS comprises a global positioning system (GPS), a global navigation satellite system (GLONASS), a Beidou navigation satellite system (BDS), a quasi-zenith satellite system (QZSS), or a satellite-based augmentation system (SBAS).

15. A non-transitory computer readable medium, storing instructions that, when executed by a processor of a first device, causes the first device to:

detect that a Bluetooth connection between the first device and a second device is broken, based on a Bluetooth disconnection signal from a Bluetooth module of the first device;

responsive to detecting that the Bluetooth connection is broken, obtain first position information of the first device, and create a geo-fence based on the first positioning information, wherein the geo-fence comprises a first geo-fence and a second geo-fence that corresponds to a position of the first device at a time when the Bluetooth connection broke, the first geo-fence is determined based on information about a cell identifier (CELL-ID), and the second geo-fence is determined based on information about a global navigation satellite system (GNSS);

obtain second positioning information of the first device;

determine, based on the second positioning information, that the first device is outside the first geo-fence or the second geo-fence, and set a state of the first application to a deactivated state; and determine, based on the second positioning information, that the first device is in the first geo-fence or the second geo-fence, and set when the first application is in the deactivated state, the state of the first application from the deactivated state to a running state, wherein the determining, based on the second positioning information, that the first device is in the first geo-fence or the second geo-fence, and set when the first application is in a deactivated state, a state of the first application from the deactivated state to a running state comprises: periodically obtaining third positioning information of the first device based on a preset time interval when it is determined, based on the second positioning information, that the first device is in the first geo-fence; and set the state of the first application from the deactivated state to the running state when it is determined, based on the third positioning information, that the first device is in the second geo-fence, and the first application is in the deactivated state.

* * * * *